US012512936B2

(12) United States Patent
Qi et al.

(10) Patent No.: US 12,512,936 B2
(45) Date of Patent: Dec. 30, 2025

(54) DATA TRANSMISSION METHOD AND DEVICE

(71) Applicant: Huawei Technologies Co., Ltd., Shenzhen (CN)

(72) Inventors: Yunlei Qi, Dongguan (CN); Qiwen Zhong, Shenzhen (CN); Zhigang Zhu, Shenzhen (CN); Kai Liu, Dongguan (CN); Jingfeng Chen, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 419 days.

(21) Appl. No.: 18/155,804

(22) Filed: Jan. 18, 2023

(65) Prior Publication Data

US 2023/0155756 A1 May 18, 2023

Related U.S. Application Data

(63) Continuation of application No. PCT/CN2021/105642, filed on Jul. 12, 2021.

(30) Foreign Application Priority Data

Jul. 25, 2020 (CN) .......................... 202010726636.X
Jul. 31, 2020 (CN) .......................... 202010761609.6

(51) Int. Cl.
*H04L 5/00* (2006.01)
*H04J 3/16* (2006.01)

(52) U.S. Cl.
CPC .............. *H04L 5/0044* (2013.01); *H04J 3/16* (2013.01)

(58) Field of Classification Search
CPC ....... H04L 5/0044; H04L 67/60; H04L 69/06; H04L 69/03; H04J 3/16; H04J 2203/0085; H04J 3/1658
See application file for complete search history.

(56) References Cited

U.S. PATENT DOCUMENTS

2018/0013511 A1 1/2018 Hussain et al.
2020/0287998 A1* 9/2020 Gorshe ................. H04L 1/0057
(Continued)

FOREIGN PATENT DOCUMENTS

CN 108632886 A 10/2018
CN 109802742 A 5/2019
(Continued)

OTHER PUBLICATIONS

"IEEE Standard for Information technology—Telecommunications and information exchange between systems—Local and metropolitan area networks—Specific requirements, Part 3: Carrier sense multiple access with collision detection (CSMA/CD) access method and physical layer specifications", IEEE Std 802.3®, 2002, (Revision of IEEE Std 802.3®, 2000 Edition), Mar. 8, 2002, 1562 Pages.
(Continued)

*Primary Examiner* — Lan-Huong Truong
(74) *Attorney, Agent, or Firm* — Slater Matsil, LLP

(57) ABSTRACT

This application provides a data transmission method, a communications apparatus, a network device, a communications system, a storage medium, and a computer program product, to resolve a current problem that bandwidth waste is relatively severe when a service is carried based on a FlexE technology. In this application, a frame structure of a fine-granularity service frame is newly defined, so that service data can be transmitted in a time division multiplexing mode by using an Ethernet (ETH) interface.

25 Claims, 33 Drawing Sheets

(56) References Cited

U.S. PATENT DOCUMENTS

| | | | |
|---|---|---|---|
| 2021/0058496 A1* | 2/2021 | Mok | H04L 69/22 |
| 2021/0320819 A1* | 10/2021 | Chen | H04L 45/745 |
| 2022/0021472 A1* | 1/2022 | Stracca | H04L 1/0041 |
| 2023/0164624 A1* | 5/2023 | Chen | H04L 69/08 |
| | | | 370/230 |
| 2024/0297849 A1* | 9/2024 | Liu | H04J 3/1658 |

FOREIGN PATENT DOCUMENTS

| | | | |
|---|---|---|---|
| CN | 109818704 A | 5/2019 | |
| CN | 111107641 A | 5/2020 | |
| CN | 110557217 B | 8/2021 | |
| EP | 3588837 A1 | 1/2020 | |
| EP | 3706341 A1 | 9/2020 | |
| WO | 2019029419 A1 | 2/2019 | |
| WO | 2019100982 A1 | 5/2019 | |
| WO | WO-2019119388 A1 * | 6/2019 | H04J 14/08 |
| WO | 2019153253 A1 | 8/2019 | |
| WO | 2020029893 A1 | 2/2020 | |

OTHER PUBLICATIONS

Liao, Y., et al., "Calendar Allocation Based on Client Traffic in the Flexible Ethernet Standard", ICC 2020—2020 IEEE International Conference on Communications (ICC), Jun. 7-11, 2020, 6 Pages.
"Flex Ethernet Implementation Agreement", IA # OIF-FLEXE-01. 0, Optical Internetworking Forum, Mar. 2016, 31 Pages.
"Flex Ethernet 2.0 Implementation Agreement", IA # OIF-FLEXE-02.0, Ia OIF-FLEXE-02.0, Optical Internetworking Forum, Jun. 22, 2018, 51 Pages.

\* cited by examiner

FIG. 8

| Input Data | Sync | Block Payload | | | | | | | |
|---|---|---|---|---|---|---|---|---|---|
| Bit Position: | | | 2 | | | | | | 65 |
| Data Block Format: $D_0D_1D_2D_3D_4D_5D_6D_7$ | 01 | $D_0$ | $D_1$ | $D_2$ | $D_3$ | $D_4$ | $D_5$ | $D_6$ | $D_7$ |
| Control Block Formats: | | Block Type Field | | | | | | | |
| $C_0C_1C_2C_3C_4C_5C_6C_7$ | 10 | 0×1E | $C_0$ | $C_1$ | $C_2$ | $C_3$ | $C_4$ | $C_5$ | $C_6$ | $C_7$ |
| $S_0D_1D_2D_3D_4D_5D_6D_7$ | 10 | 0×78 | $D_1$ | $D_2$ | $D_3$ | $D_4$ | $D_5$ | $D_6$ | $D_7$ |
| $O_0D_1D_2D_3Z_4Z_5Z_6Z_7$ | 10 | 0×4B | $D_1$ | $D_2$ | $D_3$ | $O_0$ | 0×000_0000 | | |
| $T_0C_1C_2C_3C_4C_5C_6C_7$ | 10 | 0×87 | $C_1$ | $C_2$ | $C_3$ | $C_4$ | $C_5$ | $C_6$ | $C_7$ |
| $D_0T_1C_2C_3C_4C_5C_6C_7$ | 10 | 0×99 | $D_0$ | $C_2$ | $C_3$ | $C_4$ | $C_5$ | $C_6$ | $C_7$ |
| $D_0D_1T_2C_3C_4C_5C_6C_7$ | 10 | 0×AA | $D_0$ | $D_1$ | $C_3$ | $C_4$ | $C_5$ | $C_6$ | $C_7$ |
| $D_0D_1D_2T_3C_4C_5C_6C_7$ | 10 | 0×B4 | $D_0$ | $D_1$ | $D_2$ | $C_4$ | $C_5$ | $C_6$ | $C_7$ |
| $D_0D_1D_2D_3T_4C_5C_6C_7$ | 10 | 0×CC | $D_0$ | $D_1$ | $D_2$ | $D_3$ | $C_5$ | $C_6$ | $C_7$ |
| $D_0D_1D_2D_3D_4T_5C_6C_7$ | 10 | 0×D2 | $D_0$ | $D_1$ | $D_2$ | $D_3$ | $D_4$ | $C_6$ | $C_7$ |
| $D_0D_1D_2D_3D_4D_5T_6C_7$ | 10 | 0×E1 | $D_0$ | $D_1$ | $D_2$ | $D_3$ | $D_4$ | $D_5$ | $C_7$ |
| $D_0D_1D_2D_3D_4D_5D_6T_7$ | 10 | 0×FF | $D_0$ | $D_1$ | $D_2$ | $D_3$ | $D_4$ | $D_5$ | $D_6$ |

D code block
Control code block
S code block
O code block
T code block

DATA TRANSMISSION METHOD AND DEVICE

CROSS-REFERENCE TO RELATED APPLICATIONS

This application is a continuation of International Application No. PCT/CN2021/105642, filed on Jul. 12, 2021, which claims priority to Chinese Patent Application No. 202010726636.X, filed on Jul. 25, 2020, and Chinese Patent Application No. 202010761609.6, filed on Jul. 31, 2020. All of the aforementioned patent applications are hereby incorporated by reference in their entireties.

TECHNICAL FIELD

Embodiments of the present invention relate to the field of communications technologies, and specifically, to a data transmission method and a device, and more specifically, to a method for transmitting data in an Ethernet interface or a flexible Ethernet interface and a device.

BACKGROUND

A flexible Ethernet (FlexE) technology, as an interface technology for implementing service isolation and network slicing, is developed rapidly in recent years, and is widely accepted by major standards organizations. The Optical Internet Forum (OIF) has released a FlexE standard. In the FlexE technology, a flexible Ethernet protocol layer (which may also be referred to as a FlexE shim layer) is introduced on a basis of IEEE 802.3, to decouple a medium access control (MAC) layer from a physical link layer (which may also be referred to as the PHY). In this way, flexible rate matching is implemented. Based on a time division multiplexing (TDM) distribution mechanism, the Flex shim schedules and distributes data of a plurality of FlexE clients to a plurality of different subchannels based on slots, to implement hard isolation of transmission pipe bandwidths. One service data stream may be allocated to one or more slots. In this way, matching of services with various rates is implemented.

An existing FlexE interface technology resolves, to some extent, a problem that a rate of an Ethernet interface is fixed, and a client cross-connection technology resolves a problem that a packet forwarding delay is excessively long. However, when a low-rate (for example, 10 Mbps) service is carried in the conventional technology, relatively severe channel bandwidth waste occurs.

SUMMARY

This application provides a data transmission method, a communications apparatus, a network device, a communications system, a storage medium, and a computer program product, to resolve a current problem that bandwidth waste is relatively severe when a service is carried based on a FlexE technology. According to the technical solutions of this application, channel bandwidth utilization can be greatly improved, and in particular, when a low-rate service (for example, megabit low-rate service) is carried, channel bandwidth utilization can be significantly improved, thereby avoiding bandwidth waste. Further, in this application, a frame structure of a fine-granularity service frame is newly defined, so that service data can be transmitted in a time division multiplexing mode by using an Ethernet (ETH) interface. Therefore, even a common Ethernet interface that does not support a standard FlexE mode can effectively use a bandwidth of the Ethernet interface, and bandwidth isolation is implemented.

According to a first aspect, this application provides a data transmission method, implemented by a first communications apparatus, where the method includes:

generating a first data stream, where the first data stream includes a plurality of data code blocks, where the plurality of data code blocks include a plurality of first base frames, each first base frame includes a base frame payload, the base frame payload includes a base frame overhead and a plurality of sub-user (sub-client) sub-slot payloads, the plurality of sub-client sub-slot payloads include a plurality of first sub-client sub-slot payloads, and the plurality of first sub-client sub-slot payloads include service data of a first sub-client interface; and sending the first data stream by using a first interface.

Optionally, the first interface is logically divided into Z sub-client interfaces, and the Z sub-client interfaces include the first sub-client interface.

Optionally, the first interface is a FlexE client interface.

Optionally, the first interface is an Ethernet interface.

Optionally, the first interface is a first FlexE client interface, the first communications apparatus further includes a first FlexE interface on a transmitting side, and the sending the first data stream by using a first interface includes:

sending the first data stream by using the first FlexE interface based on a slot mapping relationship between the first FlexE client interface and the first FlexE interface, where the first FlexE interface is logically divided into a plurality of FlexE client interfaces, and the plurality of FlexE client interfaces include the first FlexE client interface.

Optionally, each first base frame further includes a first code block and a second code block, the first code block is used to indicate a frame header of the first base frame, and the second code block is used to indicate a frame trailer of the first base frame.

Optionally, the first code block is an S code block, and the second code block is a T code block.

Optionally, the first code block includes a first indication field and a first data field, the first indication field is used to indicate the frame header, and the first data field is used to carry some data of the base frame payload.

Optionally, the second code block includes a second indication field and a second data field, the second indication field is used to indicate the frame trailer, and the second data field is used to carry some data of the base frame payload.

Optionally, formats of the first code block and the second code block comply with code block formats defined in an IEEE 802.3 standard.

Optionally, the base frame overhead includes one or more of the following information:

a sequence number of the base frame;
a sub-client sub-slot mapping table;
a slot adjustment request;
a slot adjustment response;
a slot effectiveness indication;
management channel information; or
base frame overhead check information.

Optionally, the first interface is divided into M sub-slots in time domain, and M is an integer greater than 1.

Optionally, a slot bandwidth of each of the M sub-slots is P, and P is less than 5 gigabit/s Gbp/s.

Optionally, the M sub-slots are evenly distributed in X first base frames, one base frame is encapsulated every time M/X sub-slots are scheduled, each base frame payload includes M/X sub-client sub-slot payloads, and X is an integer greater than 1.

Optionally, a transmission rate of the first interface is N Gbp/s, and N is greater than or equal to 1.

Optionally, the method further includes:

receiving a first sub-client sub-slot mapping table sent by a second communications apparatus, where the first sub-client sub-slot mapping table is used to indicate a first mapping relationship between the M sub-slots and the Z sub-client interfaces, and each sub-client interface is mapped to at least one of the M sub-slots; and saving the first sub-client sub-slot mapping table.

Optionally, the first sub-client sub-slot mapping table indicates the first mapping relationship by mapping Z sub-user identifiers sub-client IDs to M sub-slot identifiers sub-slot IDs, the Z sub-client IDs are used to indicate the Z sub-client interfaces, and the M sub-slot IDs are used to indicate the M sub-slots.

Optionally, the second communications apparatus is a control management device.

Optionally, the second communications apparatus is a forwarding apparatus.

Optionally, the first sub-client sub-slot mapping table is carried in the base frame overhead; or the first sub-client sub-slot mapping table is carried in a specified sub-slot among the M sub-slots.

Optionally, the first data stream is used to carry an Ethernet service.

Optionally, the generating a first data stream includes:

obtaining a first Ethernet service data stream from a physical coding sublayer (PCS);

slicing the first Ethernet service data stream to obtain a plurality of Ethernet service slices; and encapsulating the plurality of Ethernet service slices into the base frame payload as the plurality of sub-client sub-slot payloads.

Optionally, the first Ethernet service data stream includes at least one OAM code block.

Optionally, the first Ethernet service data stream includes a plurality of 64B/66B code blocks, a plurality of 64B/65B code blocks, or a plurality of 256B/257B code blocks.

Optionally, the first data stream is used to carry a constant bit rate (CBR) service.

Optionally, the generating a first data stream includes:

slicing a first CBR service data stream to obtain a plurality of pieces of CBR service slice data, where the first CBR service data stream includes a plurality of CBR service frames;

separately slicing and encapsulating the plurality of pieces of CBR service slice data to obtain a plurality of CBR service slices, where each CBR service slice includes the CBR service slice data and encapsulation information;

obtaining the plurality of sub-client sub-slot payloads based on the plurality of CBR service slices; and encapsulating the plurality of sub-client sub-slot payloads into the base frame payload.

Optionally, a slice granularity of each CBR service slice is i bits, content of the plurality of CBR service frames is not identified when the first CBR service data stream is sliced, and i is an integer.

Optionally, a slice granularity of each CBR service slice is j complete CBR service frames, and j is an integer greater than or equal to 1.

Optionally, the CBR service slice includes a first field used to carry the CBR service slice data.

Optionally, the encapsulation information includes a second field, and the second field is used to carry clock frequency information.

Optionally, the encapsulation information includes a third field, and the third field is used to carry operation, administration, and maintenance (OAM) information.

Optionally, the encapsulation information includes a fourth field, and the fourth field is used to carry a sequence number of the CBR service slice.

Optionally, the sequence number of the CBR service slice is used for slice reassembly.

Optionally, the encapsulation information includes a fifth field, the fifth field is used to carry payload length information, and the payload length information is an effective length of the CBR service slice data carried in each CBR service slice.

Optionally, the encapsulation information includes a sixth field, and the sixth field is a padding field.

Optionally, the encapsulation information includes a seventh field, and the seventh field is used to carry check information.

Optionally, the obtaining the plurality of sub-client sub-slot payloads based on the plurality of CBR service slices includes:

performing Ethernet packet encapsulation on the plurality of CBR service slices to obtain a second data stream, where the second data stream includes a plurality of code blocks; and slicing the second data stream based on a length of each sub-client sub-slot payload to obtain the plurality of sub-client sub-slot payloads.

Optionally, the second data stream includes a plurality of 64B/66B code blocks, a plurality of 64B/65B code blocks, or a plurality of 256B/257B code blocks.

Optionally, the first data stream includes a plurality of OAM code blocks used to carry OAM information.

Optionally, the obtaining the plurality of sub-client sub-slot payloads based on the plurality of CBR service slices includes:

directly using each CBR service slice as a sub-client sub-slot payload.

Optionally, the first data stream includes a plurality of 64B/66B code blocks, a plurality of 64B/65B code blocks, or a plurality of 256B/257B code blocks.

Optionally, the first sub-client interface is mapped to W sub-slots of the first interface, and the generating a first data stream includes:

respectively mapping the plurality of first sub-client sub-slot payloads to the W sub-slots, where W is an integer greater than 1.

Optionally, the respectively mapping the plurality of first sub-client sub-slot payloads to the W sub-slots includes:

scheduling the W sub-slots sequentially based on a mapping relationship between the first sub-client interface and the W sub-slots and based on a slot scheduling period of the first interface.

Optionally, the first communications apparatus includes a second sub-client interface on a receiving side, and the generating a first data stream includes:

obtaining a plurality of second sub-client sub-slot payloads of the second sub-client interface;

processing the plurality of second sub-client sub-slot payloads based on a sub-slot cross-connection relationship between the second sub-client interface and the first sub-client interface to obtain the plurality of first sub-client sub-slot payloads; and encapsulating the plurality of first sub-client sub-slot payloads into the base frame payload.

Optionally, the obtaining a plurality of second sub-client sub-slot payloads of the second sub-client interface includes:

obtaining a third data stream of a second interface on the receiving side, and demapping the plurality of second sub-client sub-slot payloads from the third data stream based on a second sub-client sub-slot mapping table, where the second interface is divided into A sub-slots in time domain, the second interface is logically divided into B sub-client interfaces, the B sub-client interfaces include the second sub-client interface, the second sub-client sub-slot mapping table is used to indicate a second mapping relationship between the A sub-slots and the B sub-client interfaces, and both A and B are integers. For a value of A, refer to the related description of the value of M in this application.

Optionally, the second interface is an Ethernet interface.

Optionally, the second interface is a second FlexE client interface.

Optionally, the first communications apparatus further includes a second FlexE interface on the receiving side, and the obtaining a third data stream includes:

obtaining a fourth data stream of the second FlexE interface, where the second FlexE interface is logically divided into a plurality of FlexE client interfaces, and the plurality of FlexE client interfaces include the second FlexE client interface; and demapping the third data stream from the fourth data stream based on a slot mapping relationship between the second FlexE client interface and the second FlexE interface, where the third data stream includes a plurality of second base frames, and the plurality of second base frames include the plurality of second sub-client sub-slot payloads.

According to a second aspect, this application provides a first communications apparatus, including:

a memory storing instructions; and a processor connected to the memory, where when the processor executes the instructions, the first communications apparatus is enabled to perform the method in any one of the first aspect and the possible implementations of the first aspect.

According to a third aspect, this application provides a computer-readable storage medium including a program or instructions, where when a computer runs the program or instructions, the computer is enabled to perform the method in any one of the first aspect and the possible implementations of the first aspect.

According to a fourth aspect, this application provides a communications system, including the first communications apparatus and a second communications apparatus, configured to perform the method in any one of the first aspect and the optional implementations of the first aspect.

According to a fifth aspect, this application provides a program product including a program or instructions, where when a computer runs the program or instructions, the computer is enabled to perform the method in any one of the first aspect and the possible implementations of the first aspect.

BRIEF DESCRIPTION OF THE DRAWINGS

FIG. 8 is a code block format defined in IEEE 802.3;

DETAILED DESCRIPTION OF ILLUSTRATIVE EMBODIMENTS

In this application, ordinal numbers such as "1", "2", "3", "4", "first", "second", "third", and "fourth" are used to distinguish between different objects, and not intended to limit an order of a plurality of objects. In addition, the terms "include" and "have" are not exclusive. For example, a process, a method, a system, a product, or a device including a series of steps or units is not limited to the listed steps or units, and may further include steps or units that are not listed.

In this application, the terms "Ethernet interface" and "ETH interface" are often used interchangeably, and the terms "FlexE interface" and "flexible Ethernet interface" are often used interchangeably.

For a conventional technology related to FlexE in this application, refer to related descriptions of a FlexE standard IA OIF-FLEXE-01.0, IA OIF-FLEXE-02.0, or IA OIF-FLEXE02.1 defined by the OIF. The standard is incorporated by reference in its entirety into this application.

Figure 1:
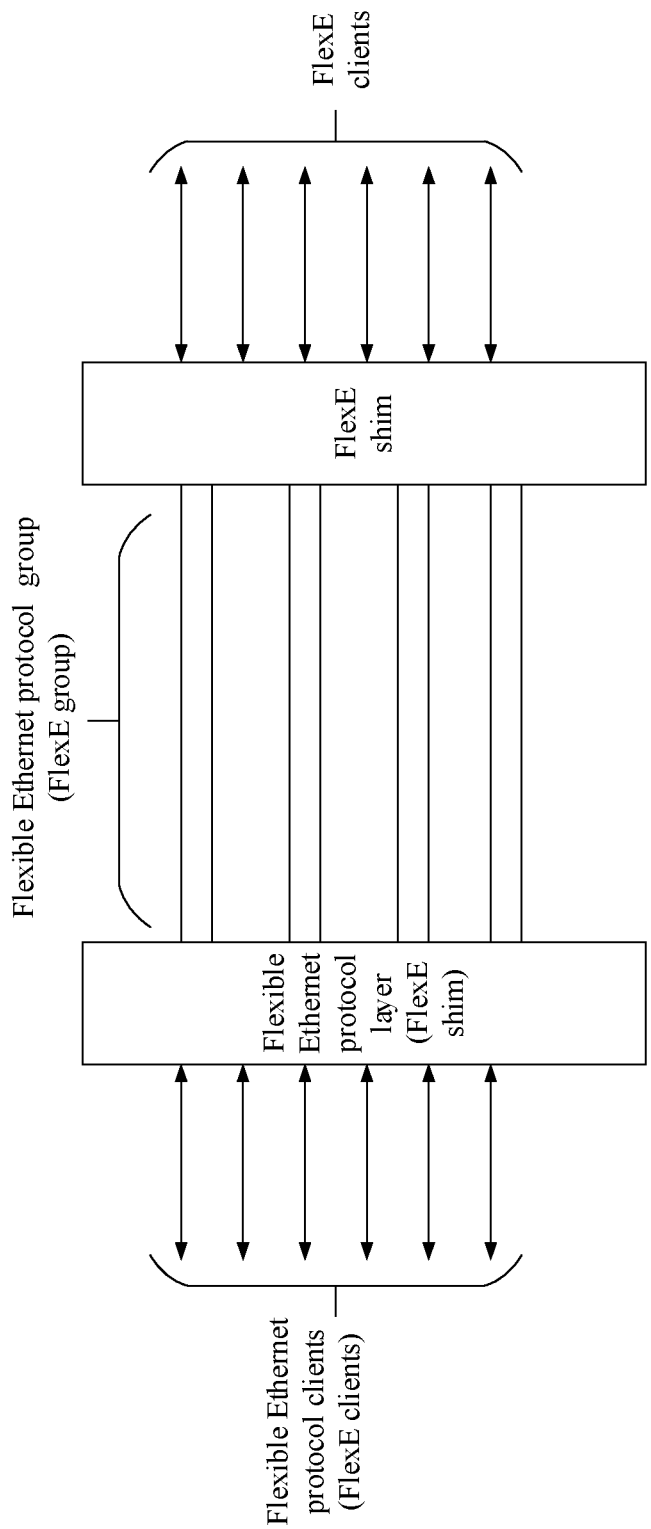
FIG. 1 is a schematic diagram of a FlexE general architecture based on a flexible Ethernet protocol.

FIG. 1 is a schematic diagram illustrating a FlexE general architecture based on a flexible Ethernet protocol. As shown in FIG. 1, a FlexE group includes four PHYs. A FlexE client represents a client data stream transmitted in a specified slot (one slot or more slots) in the FlexE group. One FlexE group may carry a plurality of FlexE clients. One FlexE client may correspond to one or more user service data streams (which may also be referred to as MAC clients). A FlexE shim layer provides data adaptation and conversion from a FlexE client to a MAC client. FlexE may support mapping and transmission of any plurality of different FlexE clients in any group of PHYs, to implement functions such as PHY bonding, channelization, and subrate. A plurality of PHYs are grouped together into one FlexE group for carrying one or more FlexE client data streams distributed and mapped from the FlexE shim layer. Using a 100 GE PHY as an example, the FlexE shim layer may divide each 100GE PHY in the FlexE group into 20-slot data bearer channels, and each slot corresponds to a bandwidth of 5 Gbps.

Figure 2:
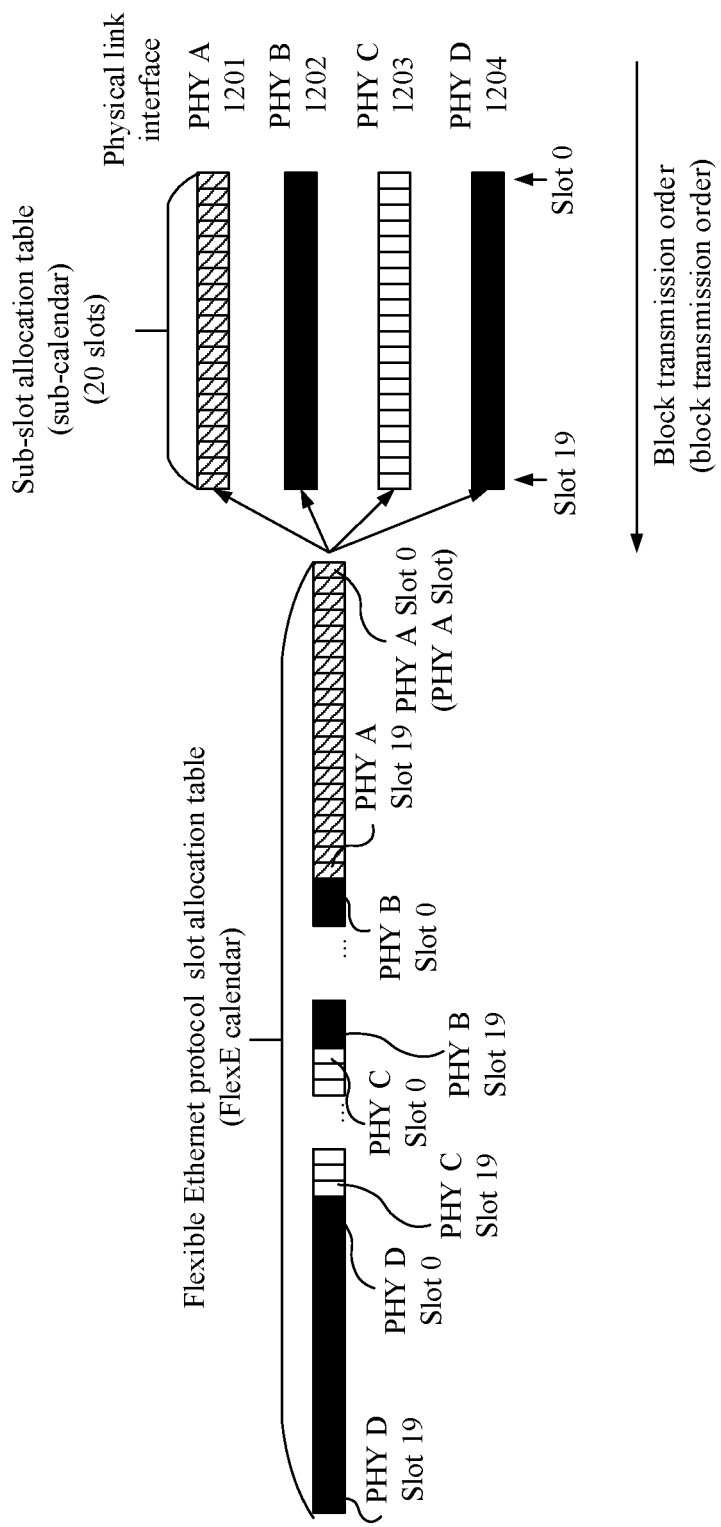
FIG. 2 is a schematic diagram of slot allocation of a FlexE group spanning four physical link interfaces (four PHYs are aggregated)

FIG. 2 is a schematic diagram of slot allocation of a FlexE group spanning four physical link interfaces (four PHYs are aggregated). As shown in FIG. 2, each PHY has 20 slots. Therefore, the FlexE group has 20×4 slots. As shown in FIG. 2, the FlexE group including four PHYs in FIG. 1 is used as an example for description, where the four PHYs are a PHY A 1201, a PHY B 1202, a PHY C 1203, and a PHY D 1204. The FlexE group corresponds to a slot allocation table (which may also be referred to as a calendar). A slot mapping table corresponding to a single physical link included in the FlexE group may be referred to as a sub-slot allocation table (which may be referred to as a sub-calendar). The FlexE calendar may include one or more sub-calendars. Each sub-calendar may indicate how 20 slots on a single physical link are allocated to corresponding FlexE clients. In other words, each sub-calendar may indicate a correspondence between slots on the single physical link and FlexE clients. As shown in FIG. 2, each PHY may correspond to 20 slots represented by a slot 0 to a slot 19 in the figure. FIG. 2 is a schematic diagram of 20 slots corresponding to each of the PHY A 1201, PHY B 1202, PHY C 1203, and PHY D 1204.

Figure 3:
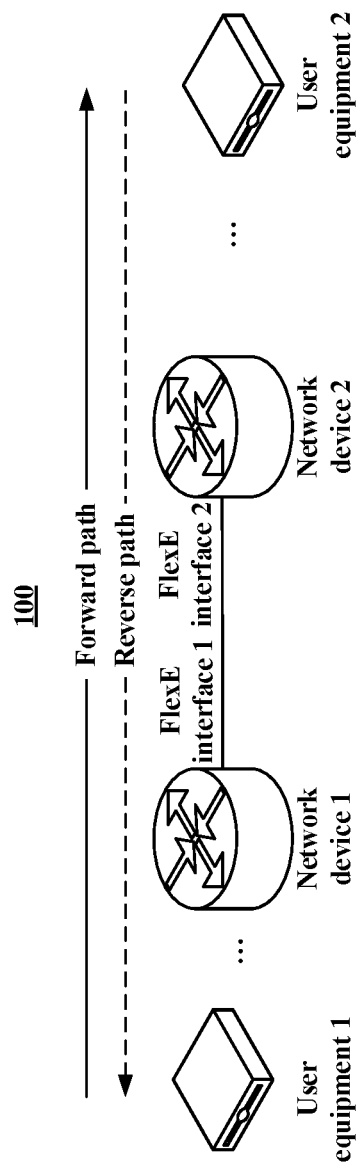
FIG. 3 is a schematic diagram of an application scenario of a FlexE communications system according to this application.

FIG. 3 is a schematic diagram of an application scenario of a FlexE communications system according to this application. As shown in FIG. 3, the FlexE communications system 100 includes a network device 1, a network device 2, user equipment 1, and user equipment 2. The network device 1 may be an intermediate node. In this case, the network device 1 is connected to the user equipment 1 by using another network device. The network device 1 may be an edge node. In this case, the network device 1 is directly connected to the user equipment 1. The network device 1 may be an intermediate node. In this case, the network device 1 is connected to the user equipment 1 by using another network device. Alternatively, the network device 1 may be an edge node. In this case, the network device 1 is directly connected to the user equipment 1. The network device 2 may be an intermediate node. In this case, the network device 2 is connected to the user equipment 2 by using another network device. Alternatively, the network device 2 may be an edge node. In this case, the network device 2 is directly connected to the user equipment 2. The network device 1 includes a FlexE interface 1, and the network device 2 includes a FlexE interface 2. The FlexE interface 1 is adjacent to the FlexE interface 2. Each FlexE interface includes a transmit port and a receive port, and differs from a conventional Ethernet interface in that one FlexE interface may carry a plurality of clients, and that the FlexE interface as a logical interface may include a plurality of physical interfaces. A flow direction of service data in a forward path shown in FIG. 3 is shown by a solid arrow in FIG. 3. A flow direction of service data in a reverse path is shown by a dashed arrow in FIG. 3. Assuming that a transmission path in this embodiment of the present invention is a forward path, a flow direction of service data in the transmission path is user equipment 1–>network device 1–>network device 2–>user equipment 2.

It should be understood that FIG. 3 illustrates only two network devices and two user equipments. The network may include any other quantity of network devices and user equipments. This is not limited in this embodiment of this application. The FlexE communications system shown in FIG. 3 is merely an example, and the application scenario of the FlexE communications system provided in this application is not limited to the scenario shown in FIG. 3. The technical solution provided in this application is applicable to all network scenarios using a FlexE technology for data transmission.

Figure 4:
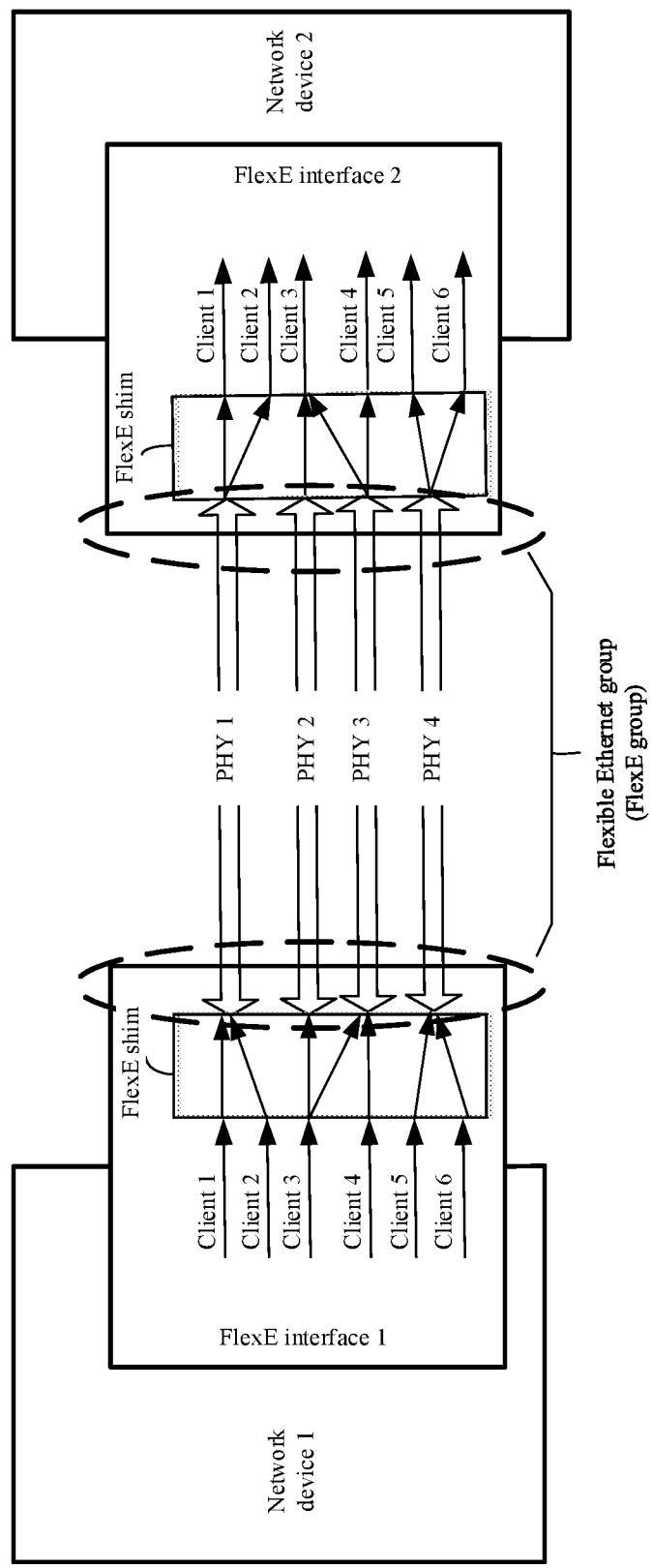
FIG. 4 is a schematic diagram of a process of transmitting data by using a FlexE technology according to this application.

With reference to FIG. 4, the following further describes a process in which the network device 1 and the network device 2 shown in FIG. 3 transmit data by using the FlexE technology.

As shown in FIG. 4, a PHY 1, a PHY 2, a PHY 3, and a PHY 4 are bonded to form a FlexE group. The network device 1 and the network device 2 are connected by a FlexE group interface, that is, connected by the FlexE interface 1 and the FlexE interface 2. The FlexE group interface may also be referred to as a FlexE interface. The FlexE group interface is a logical interface formed by bonding a group of physical interfaces. The FlexE group interface carries a total of six clients: a client 1 to a client 6. Data of the client 1 and the client 2 is mapped to the PHY 1 for transmission; data of the client 3 is mapped to the PHY 2 and the PHY 3 for transmission; data of the client 4 is mapped to the PHY 3 for transmission; and data of the client 5 and the client 6 is mapped to the PHY 4 for transmission. Different FlexE clients are mapped and transmitted in the FlexE group to implement a bonding function.

FlexE group: It may also be referred to as a bonding group. A plurality of PHYs included in each FlexE group have a logical bonding relationship. The logical bonding relationship means that different PHYs may not have a physical connection relationship. Therefore, the plurality of PHYs in the FlexE group may be physically independent. A network device in FlexE can implement logical bonding of a plurality of PHYs by using numbers of PHYs to identify which PHYs are included in one FlexE group. For example, each PHY may be identified by a number between 1 and 254.0 and 255 are reserved numbers. A number of one PHY may correspond to one interface on a network device. A same number needs to be used between two adjacent network devices to identify a same PHY. Numbers of PHYs included in one FlexE group are not necessarily continuous. Usually, there is one FlexE group between two network devices, but this application is not limited to presence of only one FlexE group between two network devices, that is, alternatively, there may be a plurality of FlexE groups between two network devices. One PHY may be used to carry at least one client, and one client may be transmitted on at least one PHY.

FlexE client: FlexE clients correspond to various user interfaces or bandwidths of the network. FlexE clients can be flexibly configured based on bandwidth requirements to support Ethernet MAC data streams at various rates (such as 10G, 40G, nx25G, and even nonstandard-rate data streams). For example, a data stream can be transmitted to a FlexE shim layer in a 64b/66b coding mode. Clients sent by a same FlexE group need to share a same clock and these clients need to be adapted based on allocated slot rates. The FlexE client interface in this application is configured to transmit a service data stream of a corresponding FlexE client. The FlexE client interface is a logical interface. Each FlexE interface may be logically divided into one or more FlexE client interfaces, each FlexE interface may be divided into a plurality of slots in time domain, and each FlexE client interface occupies at least one of the plurality of slots.

FlexE shim: It is an additional logical layer inserted between MAC layer and PHY layer (PCS sublayer) in a conventional Ethernet architecture and is a core for implementing the FlexE technology based on a slot distribution mechanism of the calendar. A main function of the FlexE shim is to slice data based on a same clock and encapsulate sliced data into pre-divided slots, and then map the slots to the PHYs in the FlexE group based on a preconfigured slot allocation table for transmission. Each slot is mapped to one PHY in the FlexE group.

Calendar: It is a slot allocation table and may also be referred to as a slot table. The FlexE group corresponds to a calendar. A slot mapping table corresponding to a single physical link (PHY) included in one FlexE group may be referred to as a sub-slot allocation table (sub-calendar). The FlexE calendar may include one or more sub-calendars. Each sub-calendar may indicate how 20 slots on a single physical link are allocated to corresponding FlexE clients. In other words, each sub-calendar may indicate a correspondence between slots on the single physical link and FlexE clients. As defined in the current standard, two calendars are specified in each FlexE overhead frame, and are a current active slot table (Calendar A) and a standby slot table (Calendar B) respectively.

FlexE constructs a fixed frame format for physical interface transmission and divides TDM slots. As described above, the FlexE shim layer reflects a mapping relationship between a client and a slot in the FlexE group and a calendar working mechanism by defining an overhead frame and an overhead multiframe. It should be noted that the overhead frame may also be referred to as a flexible Ethernet overhead frame, and that the overhead multiframe may also be referred to as a flexible Ethernet overhead multiframe. The FlexE shim layer provides an in-band management channel by using overheads, supports transmission of configuration and management information between two interconnected FlexE interfaces, and implements auto-negotiation and establishment of a link.

Figure 5:
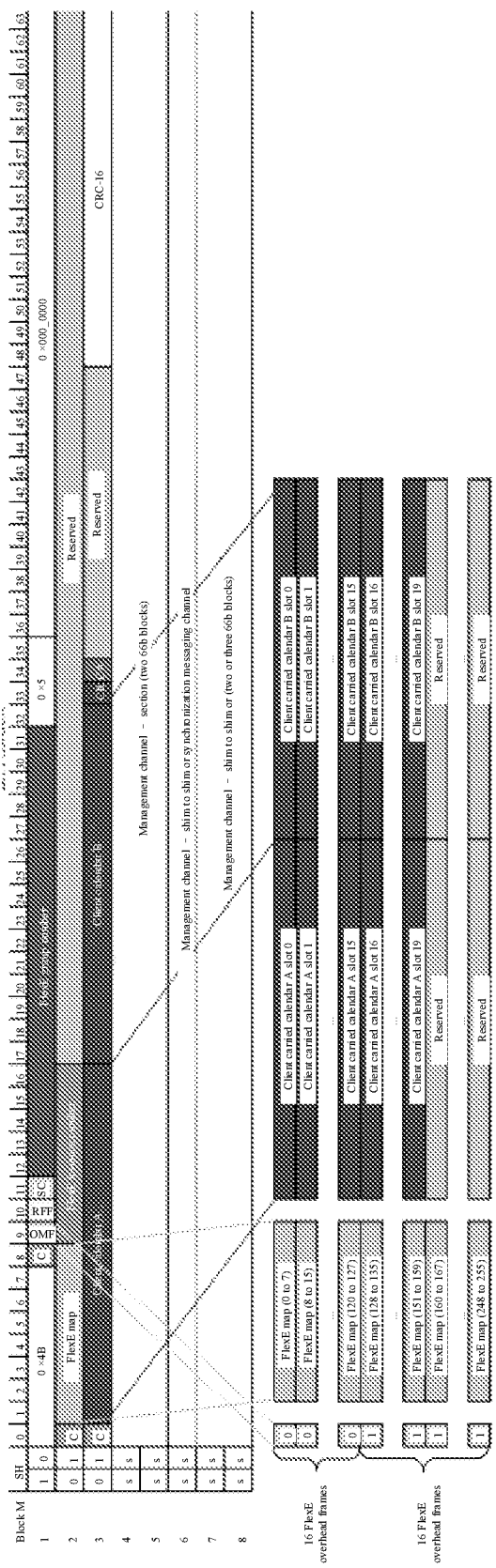
FIG. 5 is a schematic diagram of a structure of an overhead frame and an overhead multiframe of a 100 GE interface according to an OIF IA-FLEXE-02.1 standard.

Data on each PHY of FlexE is aligned by periodically inserting a code block of a FlexE overhead (OH) frame, for example, inserting one 66b overhead code block FlexE OH at an interval of 1023×20 66b payload data code blocks. According to the FlexE Implementation Agreement, a FlexE group sends a 64b/66b code block of a FlexE overhead frame to a remote PHY at a predetermined time interval on each PHY, and 64b/66b code blocks of eight sequentially sent FlexE overhead frames constitute one FlexE overhead frame. FlexE defines some fields in an overhead frame, for carrying a slot allocation table, and synchronizes the slot allocation table to a PHY on a remote communications device by using the FlexE overhead frame, to ensure that two communications devices use the same slot allocation table to receive and send a data stream corresponding to a FlexE client. Specifically, FIG. 5 is a schematic diagram of a structure of an overhead frame and an overhead multiframe of a 100GE interface according to the OIF IA-FLEXE-02.1 standard. One overhead frame has eight overhead blocks, and the overhead block may also be referred to as an overhead slot. Each overhead block is a 64B/66B code block and appears once at an interval of 1023×20 blocks, but fields included in the overhead blocks are different. In the overhead frame, a first overhead block includes a control character "oX4B" and an "O code" character "ox5", and during data transmission, a first overhead frame is determined by matching the control character and the "O code" character between interconnected FlexE interfaces. 32 overhead frames constitute one overhead multiframe.

Figure 6:
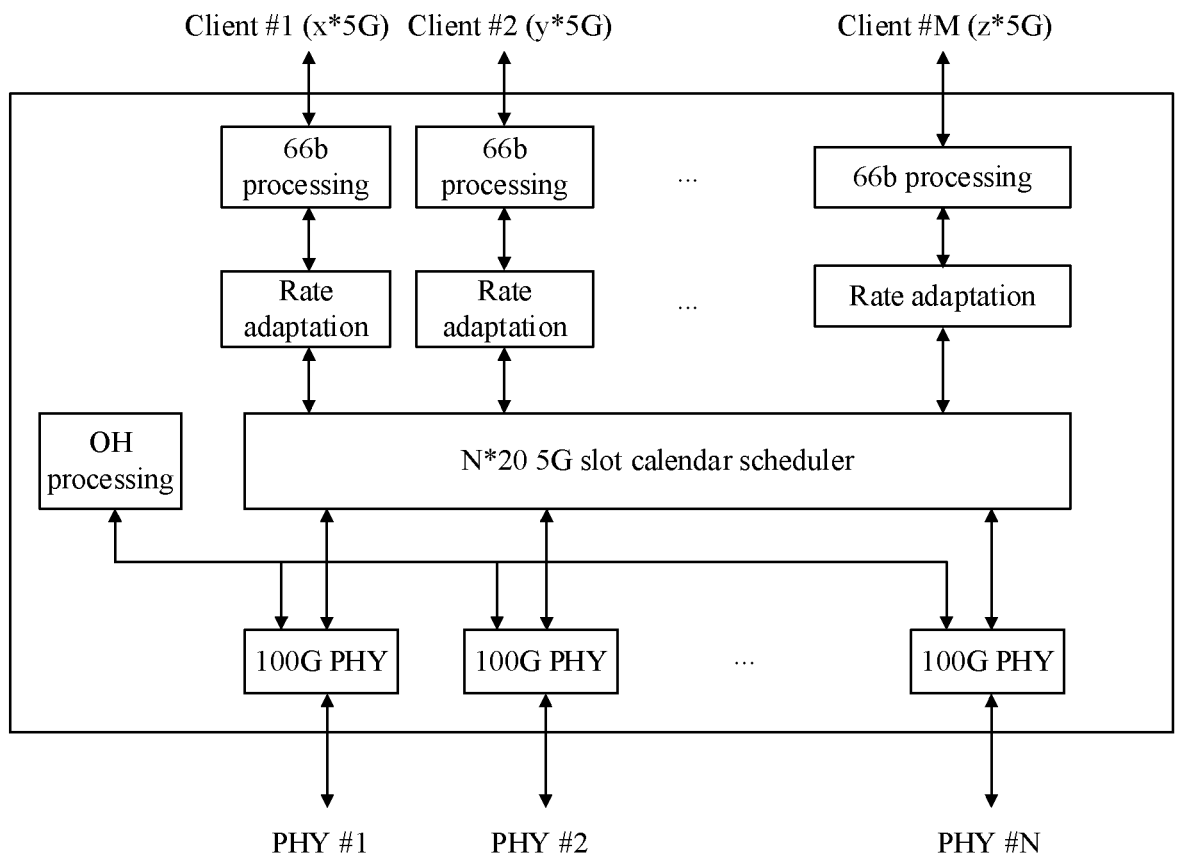
FIG. 6 is a schematic diagram of slot allocation of a plurality of FlexE clients when N 100G PHYs are bonded.

In the foregoing description, the FlexE general architecture based on the flexible Ethernet protocol and the process of transmitting data based on the existing FlexE technology are described with reference to FIG. 1 to FIG. 5. The current OIF FlexE standard defines a 50G/100G/200G/400G interface framework, where N slots are allocated to FlexE client interfaces of different rates in a slot cycle period, each slot with a slot bandwidth of a 5 Gbps (hereinafter referred to as 5G) granularity. Therefore, N=Interface rate/5 Gbps. Using a 100G PHY as an example, as shown in FIG. 6, each PHY includes 20 5G slots, and there are NX20 5G slots in total when N PHYs are bonded. Therefore, a bandwidth allocated to each FlexE client needs to be an integer multiple of 5G, and a minimum bandwidth is 5G, that is, at least one slot is allocated. In FIG. 6, a slot bandwidth of each slot is 5G, x slots are allocated to a FlexE client #1, y slots are allocated to a FlexE client #2, . . . , z slots are allocated to a FlexE #M. However, plenty of low-rate services exist at a current application layer. For example, an automatic teller machine (ATM) service of a bank requires a very small bandwidth, and may require only 100 Mbps. In this case, even if a smallest 5G FlexE client channel (occupying only one slot) is used to carry the service, a bandwidth of 4.9G is wasted, and the service requirement cannot be accurately matched.

To resolve the foregoing technical problem, this application redefines a fine-granularity sub-client interface on a basis of an existing FlexE interface or a common Ethernet physical interface. An interface rate of each sub-client interface may be flexibly set based on requirements of different low-rate services, to avoid bandwidth waste as much as possible. Further, this application further provides a sub-slot cross-connection technology, and on a basis of fully using the bandwidth, forwarding based on a slot cross-connection technology in a device can effectively reduce a forwarding delay.

Before the technical solutions provided in this application are described, for ease of understanding of the technical solutions in this application, some technical terms used in this application are briefly described.

Sub-slot: The sub-slot may also be referred to as a lower-order slot, in contrast to a slot configured on an existing FlexE client interface (which may also be referred to as a large slot or a higher-order slot) or a large bandwidth of a common ETH interface. For a standard FlexE client interface or a common ETH interface, each FlexE client interface or ETH interface is divided into M sub-slots in time domain, and each sub-user interface occupies a bandwidth of at least one sub-slot for data transmission.

FlexE sub-shim: Based on a sub-slot distribution mechanism, data of a same sub-client is sliced, and sliced data is encapsulated into a sub-slot obtained through pre-division as a sub-slot payload. Then each sub-slot obtained through division is mapped to a corresponding FlexE client interface based on a pre-obtained sub-client sub-slot mapping table. Each sub-slot is mapped to one FlexE client interface.

Sub-user: Sub-clients correspond to various sub-user interfaces or bandwidths of the network. FlexE sub-clients can be flexibly configured based on bandwidth requirements to support Ethernet MAC data streams at various rates (such as 10G, 40G, nx25G, and even nonstandard-rate data streams). For example, a data stream can be transmitted to the FlexE sub-shim layer in a 64b/66b or 64b/65b transcoding or 256b/257b transcoding mode.

Sub-user interface: It is a sub-client interface. The sub-user interface may also be referred to as a sub-slot interface, a lower-order sub-slot interface, a sub-slot channel, or a lower-order slot channel. The sub-user interface is a concept relative to an existing FlexE client interface or a common Ethernet interface. Each FlexE client interface or common Ethernet interface is logically divided into a plurality of sub-user interfaces, and is divided into a plurality of sub-slots in time domain. Each sub-user interface occupies at least one sub-slot for data transmission. A slot bandwidth granularity of each sub-slot is usually less than 5 Gbps, and may be, for example, any value from lo Mbps to wo Mbps, so that more low-rate services are carried and that the bandwidth is effectively used.

Sub-client sub-slot payload: It is data obtained by slicing data of a same sub-client. Each slice is encapsulated into a sub-slot obtained through pre-division as a sub-client sub-slot payload.

Sub-client sub-slot mapping table: It may also be referred to as a lower-order path slot allocation table, a sub-client sub-slot allocation table, or a lower-order path slot mapping table. The sub-client sub-slot mapping table is used to identify a quantity of slots allocated to each sub-client sub-interface and slot positions.

Base frame: It is a data structure provided in this application, and is used to carry service data streams of different sub-clients. Each base frame includes a base frame payload. The base frame payload includes a base frame overhead and a lower-order slot payload (that is, a sub-client sub-slot payload). In this application, each lower-order slot payload has a same length, for example, Y bits. Each lower-order slot payload may be a plurality of 64b/66b code blocks. To further improve data transmission efficiency, each lower-order slot payload may be a plurality of 64B/65B code blocks or 256B/257B code blocks, where the plurality of 64B/65B code blocks or 256B/257B code blocks may be obtained, by using a transcoding algorithm, by transcoding and compressing a plurality of 64B/66B code blocks encoded by the PCS, where the transcoding algorithm may be, for example, 64B/65B transcoding or 256B/257B transcoding. The base frame overhead is used to transmit overhead information, where the overhead information may include but is not limited to one or more of the following information:

a sequence number of the base frame;
a sub-client sub-slot mapping table;
a slot adjustment request;
a slot adjustment response;
a slot effectiveness indication;
management channel information; and
overhead check information.

The sequence number of the base frame may be used to identify a position of the base frame in an entire multiframe. Numbers of sub-slots comprised in the base frame may be known based on the position information. The sub-client sub-slot mapping table may be used to identify a quantity of slots allocated to each lower-order path and slot positions. The slot adjustment request is used to send a slot adjustment request, for example, used to adjust a slot of a sub-client. The slot adjustment response is a response to receiving the slot adjustment request. The slot effectiveness indication is used to indicate that the slot adjustment becomes effective. The management message channel may be used to transmit a network element management message or may be used to transmit sub-client sub-slot mapping table information. The overhead check information is used to check the base frame overhead. A check algorithm may be but is not limited to a bit error detection algorithm such as CRC or BIP. The sub-client sub-slot payload is used to carry data of different sub-client interfaces based on the sub-client sub-slot mapping table. Each base frame further includes a code block for delimiting the base frame header and a code block for delimiting the base frame trailer.

Figure 7:
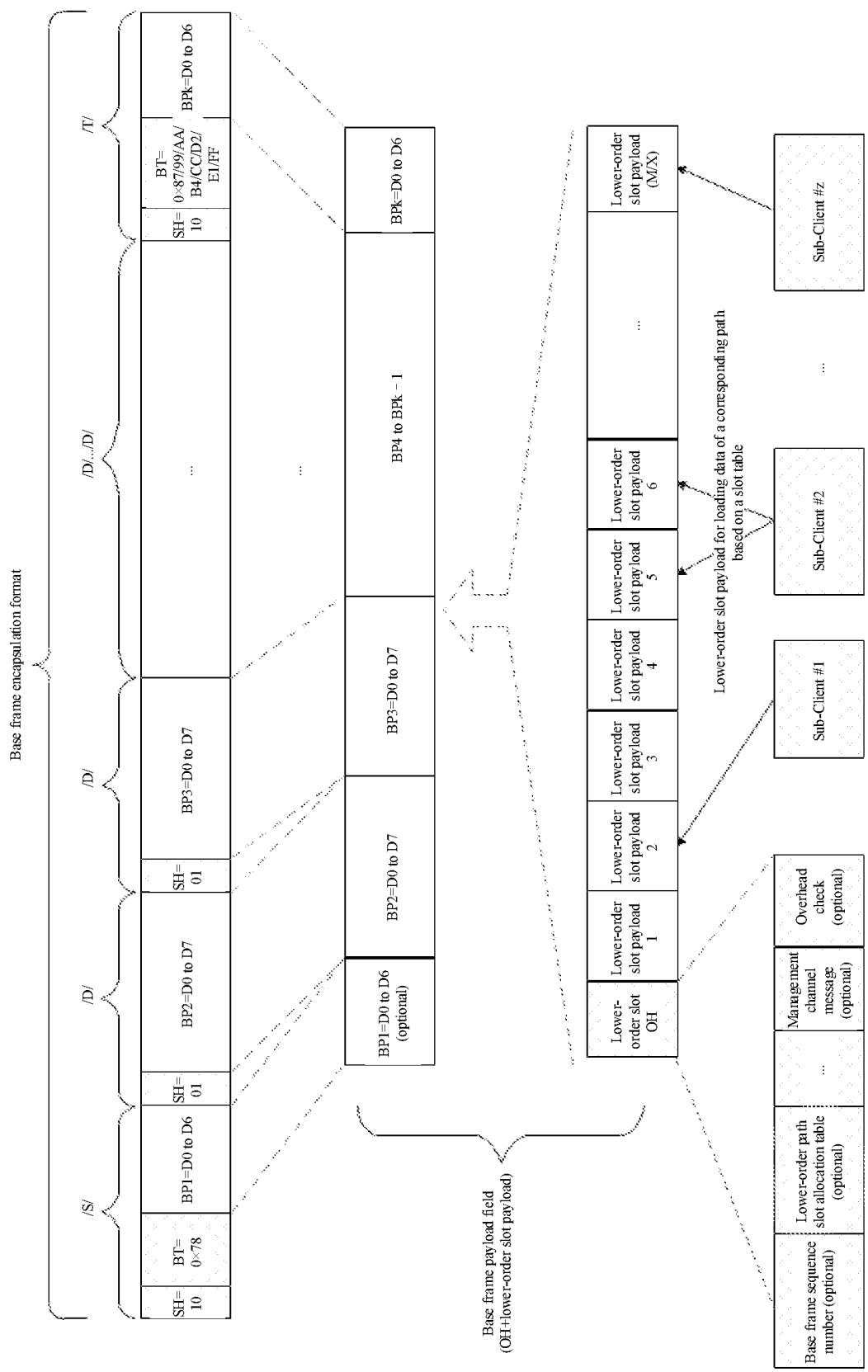
FIG. 7 is a schematic diagram of a base frame encapsulation process according to this application.

FIG. 7 is a schematic diagram of a specific base frame encapsulation format according to this application. However, a person skilled in the art may understand that FIG. 7 should not be understood as a limitation on the base frame encapsulation format. As shown in FIG. 7, for compatibility with an Ethernet frame format defined in IEEE 802.3, a base frame is encapsulated by using an /S/ code block, a /D/ code block, and a /T/ code block. The /S/ code block is used to indicate a frame header of the base frame. The /T/ code block is used to indicate a frame trailer of the base frame. A data field of the /D/ code block (such as a block payload field shown in FIG. 7 or FIG. 8) is used to carry a base frame payload. An /I/ code block may be used for rate adaptation of the base frame. In a specific implementation, a format of each code block in the base frame may, for example, comply with a code block format defined in IEEE802.3, as shown in FIG. 8. In a specific implementation, some or all data fields (block payload (BP)) in the /S/ code block and/or the /T/ code block and data fields of the /D/ code block jointly carry the base frame payload, where the BP in the S code block is an optional field, and the T code may be any one of seven code blocks T0 to T7.

Figure 9:
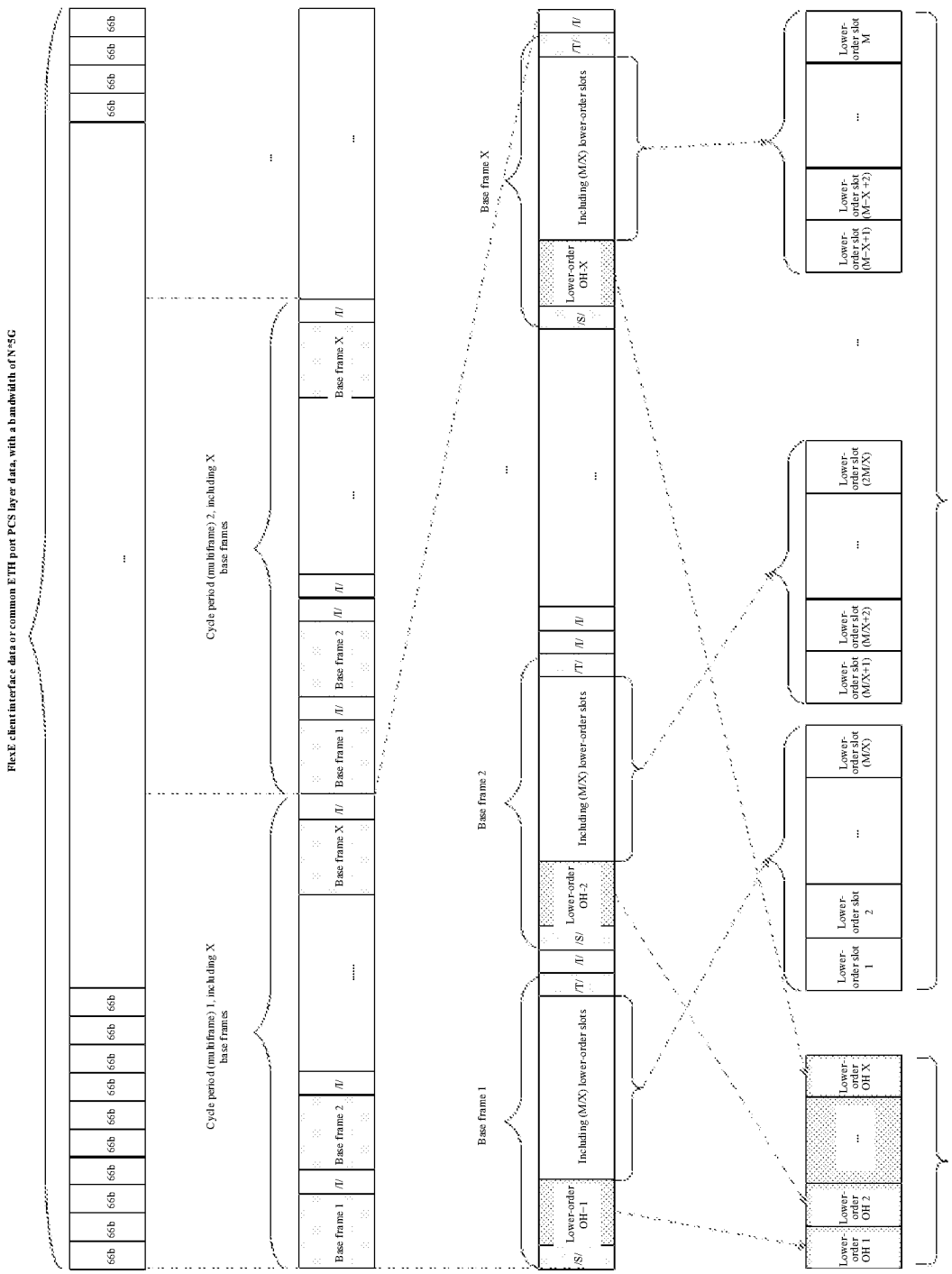
FIG. 9 is a schematic diagram of a structure of data transmitted based on a sub-client interface according to this application.

FIG. 9 is a schematic diagram of a structure of data transmitted based on a sub-user interface according to this application. As shown in FIG. 9, a FlexE client interface whose bandwidth is Nx5G or a common ETH interface is divided into M sub-slots for cyclic transmission. In other words, each cycle period is M sub-slots. The cycle period may also be referred to as a sub-slot scheduling period of a sub-user interface or a slot scheduling period of a sub-user interface. In a specific implementation, the M sub-slots are evenly distributed in X base frames, and (M/X) lower-order slots are loaded in each base frame payload. Every X base frames may also be defined as one multiframe. In each cycle period, one multiframe is transmitted. In a specific implementation, according to an Ethernet packet transmission specification, a length of the multiframe should be less than or equal to 9600 bytes.

Figure 10:
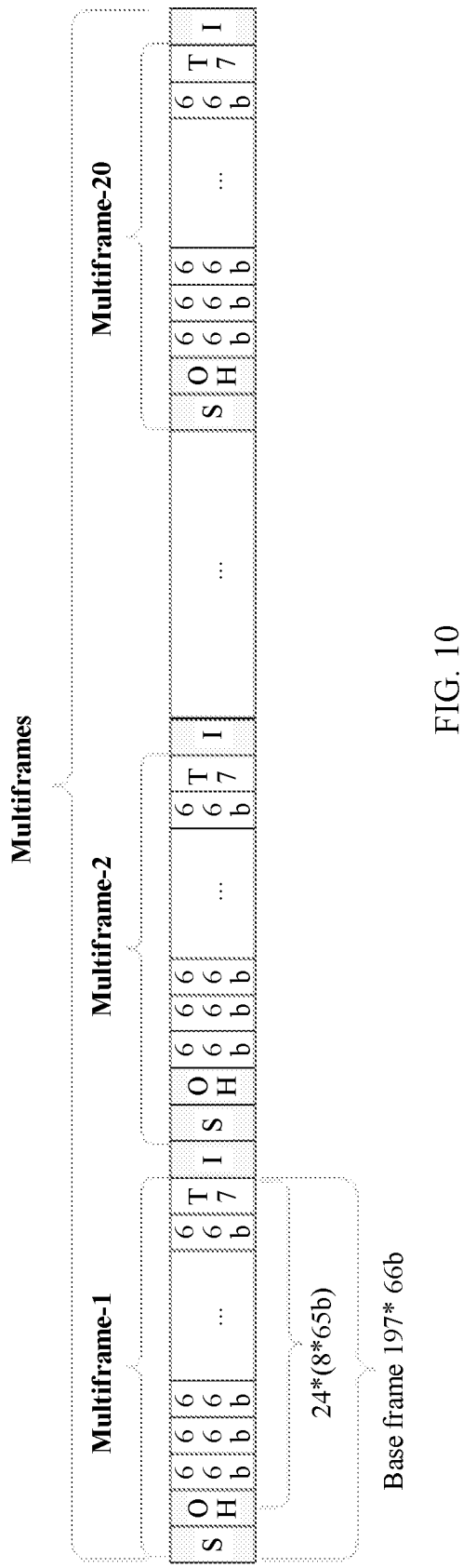
FIG. 10 is a schematic diagram of a multiframe encapsulation format according to this application.

In this application, each FlexE interface may be logically divided into a plurality of FlexE client interfaces. One FlexE client interface may be logically divided into a plurality of FlexE sub-client interfaces, and one FlexE client interface may be divided into M sub-slots in time domain. For FlexE client interfaces with different bandwidths and bandwidths of different FlexE sub-client interfaces, M may be flexibly configured. For example, FIG. 10 is a schematic diagram of a multiframe encapsulation format according to this application. With reference to FIG. 10, each 5G FlexE client interface may be divided into 480 sub-slots (that is, M=480) in time domain. 20 base frames, that is, one multiframe, are evenly distributed in each slot scheduling period on a FlexE client interface (one slot scheduling period is 480 sub-slots). In this application, the base frame is named fgDu. Each base frame includes 24 sub-slots. In a specific embodiment, each sub-slot payload may include eight 66b compressed code blocks. For a base frame, in addition to /S/, /OH/, and /T/ code blocks for encapsulation, one base frame may include 197 66b code blocks. For rate adaptation, an /I/ code block may be added between base frames, or some /I/ code blocks may be replaced with OAM code blocks transmitted in a FlexE client interface. The /I/ code block, that is, an idle code block, is used for rate adaptation at a MAC layer.

Figure 11:
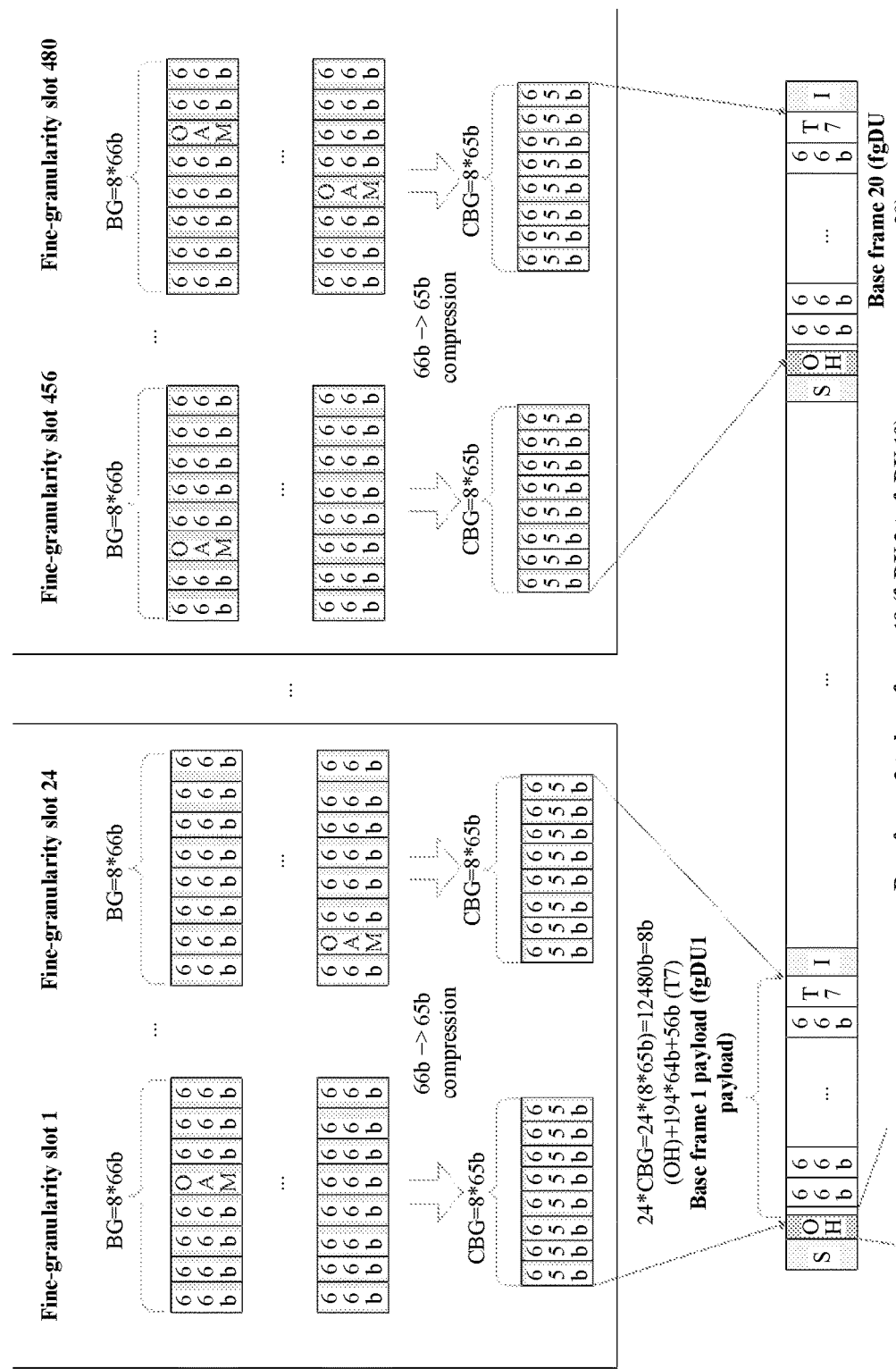
FIG. 11 is a schematic diagram depicting a multiframe format according to this application.

In a specific implementation, FIG. 11 is a schematic diagram depicting a multiframe format according to this application. FIG. 11 may be used to further describe the multiframe structure shown in FIG. 10. A fine-granularity slot 1 to a fine-granularity slot 480 described in FIG. 11 correspond to a sub-slot 1 to a sub-slot 480.

As shown in FIG. 11, one multiframe includes 480 sub-slots, each base frame includes 24 sub-slots, and each sub-slot includes eight 66b compressed code blocks, that is, eight 65b code blocks. A code block compression process is shown in FIG. 11. After an OAM code block is periodically inserted into a 66b code block stream, code block compression is performed. After compression, each sub-slot includes eight 65b code blocks. In a specific implementation, some fields in a base frame overhead may be used to carry data. For example, if only 56 bits are required in the base frame overhead, remaining eight bits of each base frame overhead may be used to carry data. In a specific implementation, a first field in a code block used to identify a frame trailer may be used to indicate the frame trailer, and a second field is used to carry data. For example, a control character in a T code block shown in FIG. 11 indicates the frame trailer, and a BP field in the T code block may be used to carry data, that is, 56 bits in the T code block may be used to carry data. Therefore, for example, as shown in FIG. 11, a quantity of bits used to carry service data in the base frame is equal to 24×(8×65b)=12480b=8b (8 remaining bits in the OH)+194× 64b+56b (56 bits in the T code block).

Figure 12:
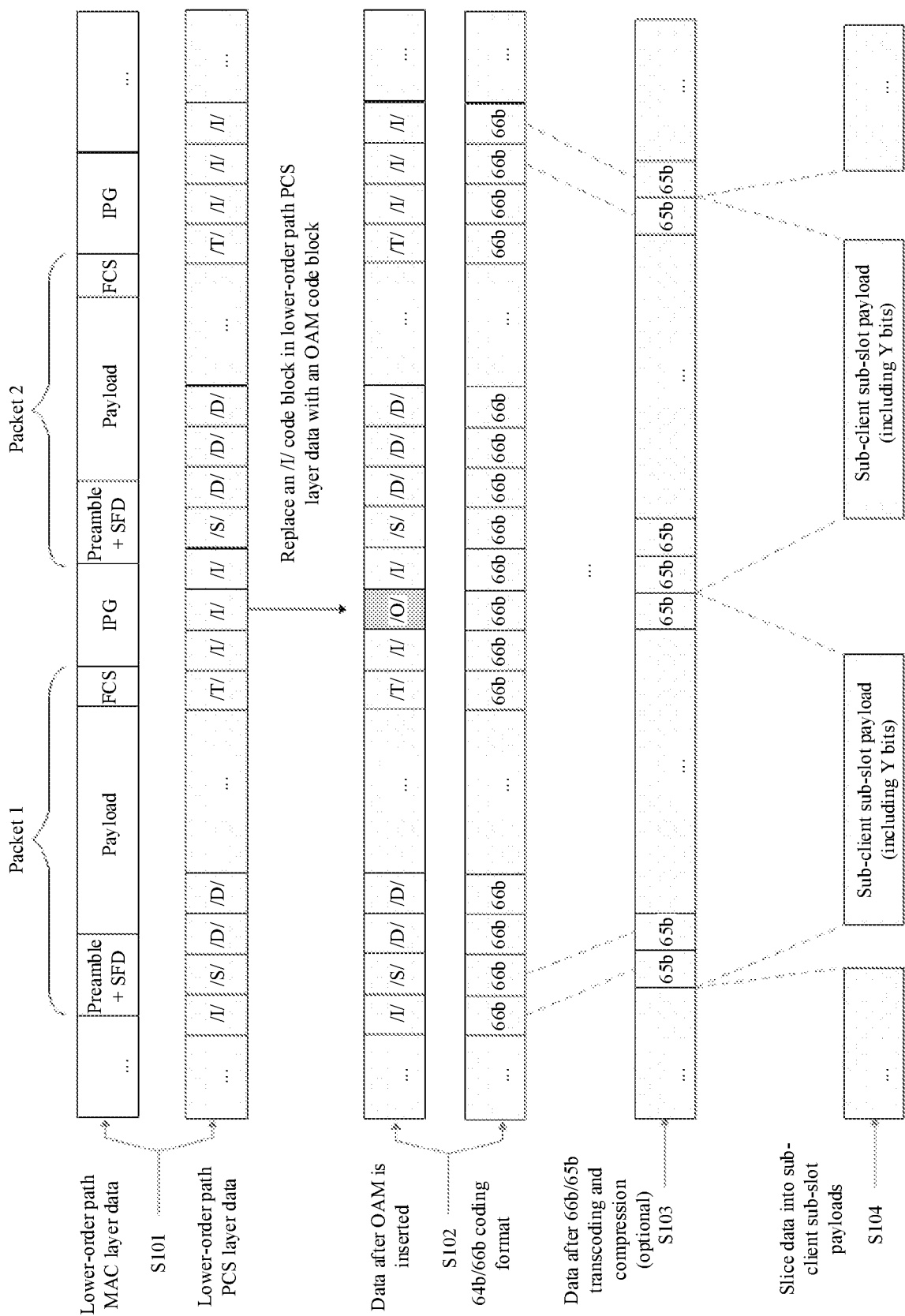
FIG. 12 is a schematic flowchart of a method for obtaining a sub-client sub-slot payload of an Ethernet service according to this application.

With reference to FIG. 12, the following describes a method 100 for obtaining a sub-client sub-slot payload of an Ethernet service according to this application. The method includes: obtaining an Ethernet service data stream from a PCS; slicing the first Ethernet service data stream to obtain a plurality of Ethernet service slices; and using the plurality of Ethernet service slices as a plurality of sub-client sub-slot payloads. In a specific example, with reference to S101 to S103 in FIG. 12, how to obtain the Ethernet service data stream is described in detail, and with reference to S104, how to slice the Ethernet service data stream to obtain the plurality of sub-client sub-slot payloads is described.

S101. A PCS encodes a MAC layer Ethernet packet.

In a specific implementation, as shown in FIG. 12, with reference to an Ethernet layered model defined in IEEE 802.3, each lower-order path, that is, each sub-client interface, is considered as an independent port and is divided into a MAC layer and a PCS. The MAC layer implements service packet encapsulation and check processing, and the PCS performs 64B/66B coding on the MAC layer packet, that is, an Ethernet service data stream, in an 802.3 coding mode. The coded code block stream includes an S code block, a D code block, a T code block, and an I code block (that is, an idle code block, also referred to as an idle code block). A code block format complies with a standard code block format defined in IEEE802.3.

S102. Insert a lower-order path layer OAM code block into a code block stream encoded by the PCS, to obtain the Ethernet service data stream. The OAM code block is used to transmit OAM information. For example, an adjacent /I/ code block may be selected at a time interval (for example, 3.3 ms) or an interval of a quantity of code blocks (for example, 500) for inserting an OAM code block.

In a specific implementation, the OAM information may be, for example, an OAM message. Refer to an MTN path layer OAM format defined in the ITU G.MTN standard.

S103. Optionally, perform transcoding and compression on a 64b/66b code block stream into which an OAM message is inserted.

In a specific implementation, the compressed code block stream includes a plurality of 64b/65b code blocks. In a specific implementation, the compressed code block stream includes a plurality of 256b/257b code blocks.

Performing transcoding and compression on the code block stream can improve efficiency of carrying data in a lower-order path. A transcoding algorithm may be 256B/257B transcoding. FIG. 12 shows only the 64B/65B transcoding, and the 256B/257B transcoding is similar to 64B/65B transcoding, details are not described again.

S104. Slice the Ethernet service data stream (which may also be referred to as the code block stream) based on a length (Y bits) of each sub-client sub-slot payload. The length of each sub-client sub-slot payload may be Z 64b/66b code blocks. If transcoding and compression are performed, the length may alternatively be Z transcoded 64b/65b code blocks or Z transcoded 256b/257b code blocks. Y and Z are both integers.

Each slice obtained by performing the slicing operation in S104 is encapsulated into a base frame payload as a sub-client sub-slot payload. For the base frame payload and the related format of the base frame, refer to the foregoing description. Details are not described herein again.

Figure 13:
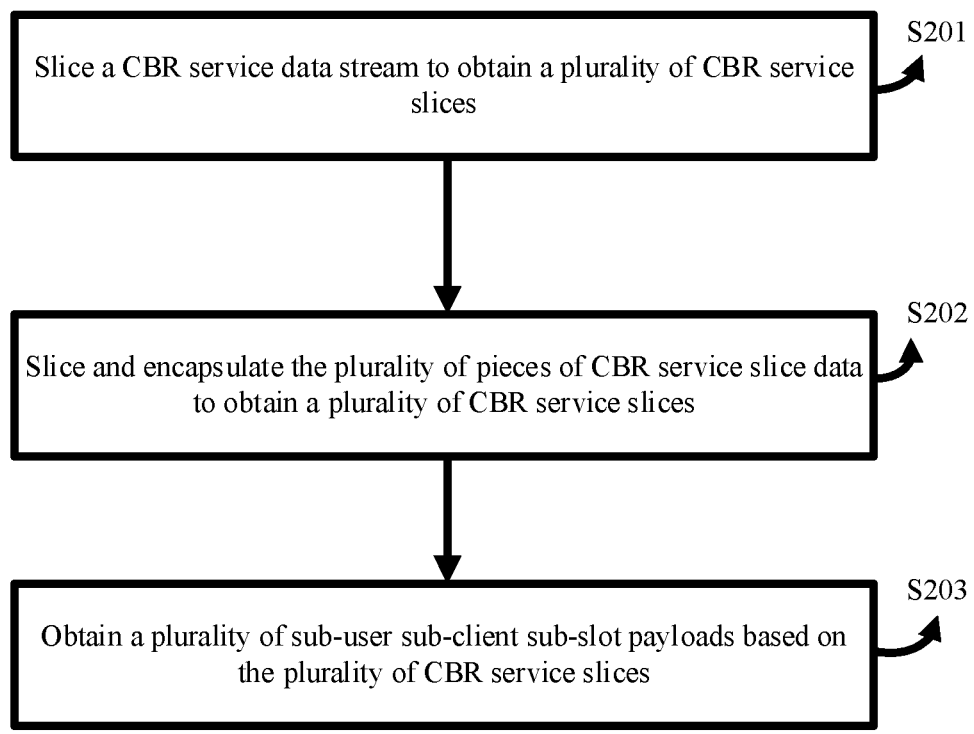
FIG. 13 is a schematic flowchart of a method for obtaining a sub-client sub-slot payload of a CBR service according to this application.

With reference to FIG. 13, the following describes a method 200 for obtaining a sub-client sub-slot payload of a constant bit rate (CBR) service according to this application.

S201. Slice a CBR service data stream to obtain a plurality of pieces of CBR service slice data. The first CBR service data stream includes a plurality of CBR service frames.

The slicing of the CBR service data stream includes but is not limited to the following two modes:

Mode 1: bit-transparent slicing mode.

In bit transparent slicing mode, content of a service frame is not identified, and slicing is performed based on a fixed quantity of bits (for example, i bits).

Mode 2: frame slicing mode.

In frame slicing mode, a service frame format needs to be identified, and slicing is performed based on a fixed quantity of frames (for example, j frames).

S202. Separately slice and encapsulate the plurality of pieces of CBR service slice data to obtain a plurality of CBR service slices, where each CBR service slice includes the CBR service slice data and encapsulation information.

In a specific implementation, each CBR service slice includes a plurality of fields respectively used to carry CBR service slice data and encapsulation information.

In a specific implementation, the CBR service slice includes a first field used to carry the CBR service slice data.

In a specific implementation, the encapsulation information includes any one or more fields from a second field to a seventh field that are used to carry different encapsulation information.

Second field: The second field is used to carry clock frequency information. The clock frequency information may include, for example, information such as a timestamp, used to transmit clock information of the service.

Third field: The third field is used to carry operation, administration and maintenance OAM information.

Fourth field: The fourth field is used to carry a sequence number of the CBR service slice. The sequence number of the CBR service slice may be used, for example, for slice reassembly. The sequence number of the CBR service slice may be further used for slice loss detection or lossless protection.

Fifth field: The fifth field is used to carry payload length information, and the payload length information is an effective length of the CBR service slice data carried in each CBR service slice.

Sixth field: The sixth field is a padding field. However, the padding field can be used for data padding only when an encapsulated service slice is shorter than a length of a sub-slot payload.

Seventh field: The seventh field is used to carry check information. The check information may be used to perform a bit error check on slice data. However, this application is not limited to mandatory inclusion of the check information in the slice. The check function may alternatively be performed in another manner, for example, using OAM to perform the check.

S203. Obtain a plurality of sub-client sub-slot payloads based on the plurality of CBR service slices.

In a specific implementation, the plurality of CBR service slices may be directly used as the plurality of sub-client sub-slot payloads, that is, a length of each CBR service slice obtained after encapsulation and each sub-client sub-slot payload remain the same, for example, are both Y bits. The following describes this manner by using a specific example with reference to FIG. 14.

In another specific implementation, the obtaining a plurality of sub-client sub-slot payloads based on the plurality of CBR service slices includes:

performing Ethernet packet encapsulation on the plurality of CBR service slices to obtain a second data stream, where the second data stream includes a plurality of code blocks; and slicing the second data stream based on a length of each sub-client sub-slot payload to obtain the plurality of sub-client sub-slot payloads. The following describes this implementation by using a specific example with reference to FIG. 15.

Figure 14:
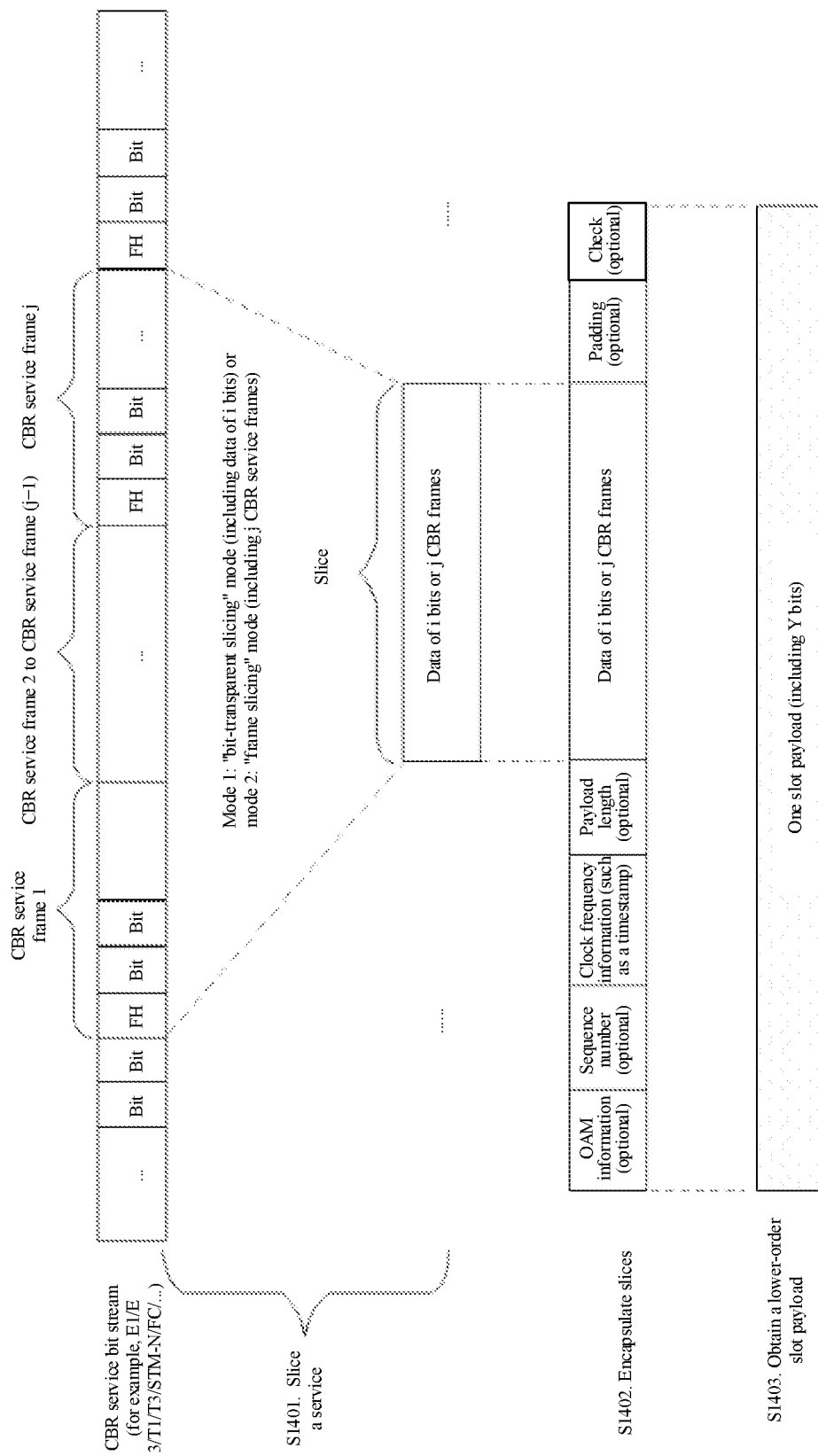
FIG. 14 is a schematic flowchart of a specific method for obtaining a sub-client sub-slot payload of a CBR service according to this application.

FIG. 14 is a schematic diagram of a method for obtaining a sub-client sub-slot payload of a CBR service according to this application. The method 1400 may be specifically used to implement the method 200. The method includes the following steps.

S1401. Slice CBR service data to obtain a plurality of pieces of CBR service slice data corresponding to slices shown in FIG. 14. The slicing mode is the mode 1 or mode 2 described above.

S1402. Encapsulate each piece of service slice data. A slice length after encapsulation is the same as a lower-order slot payload length (for example, Y bits). Encapsulation information includes one or more of the following information:

OAM information (optional), used for fault detection and protection operations at a lower-order path layer of the CBR service;

a sequence number (optional);

clock frequency information, used to transmit clock information (such as a timestamp) of the service;

payload length and padding, optional, where if an encapsulated service slice is less than the lower-order slot payload length, data padding is required and an effective payload length is identified; and a check field, optional, used to perform a bit error check on slice data, where the check function may alternatively be performing the check by using OAM.

S1403. Use sliced data as a sub-client sub-slot payload.

Figure 15:
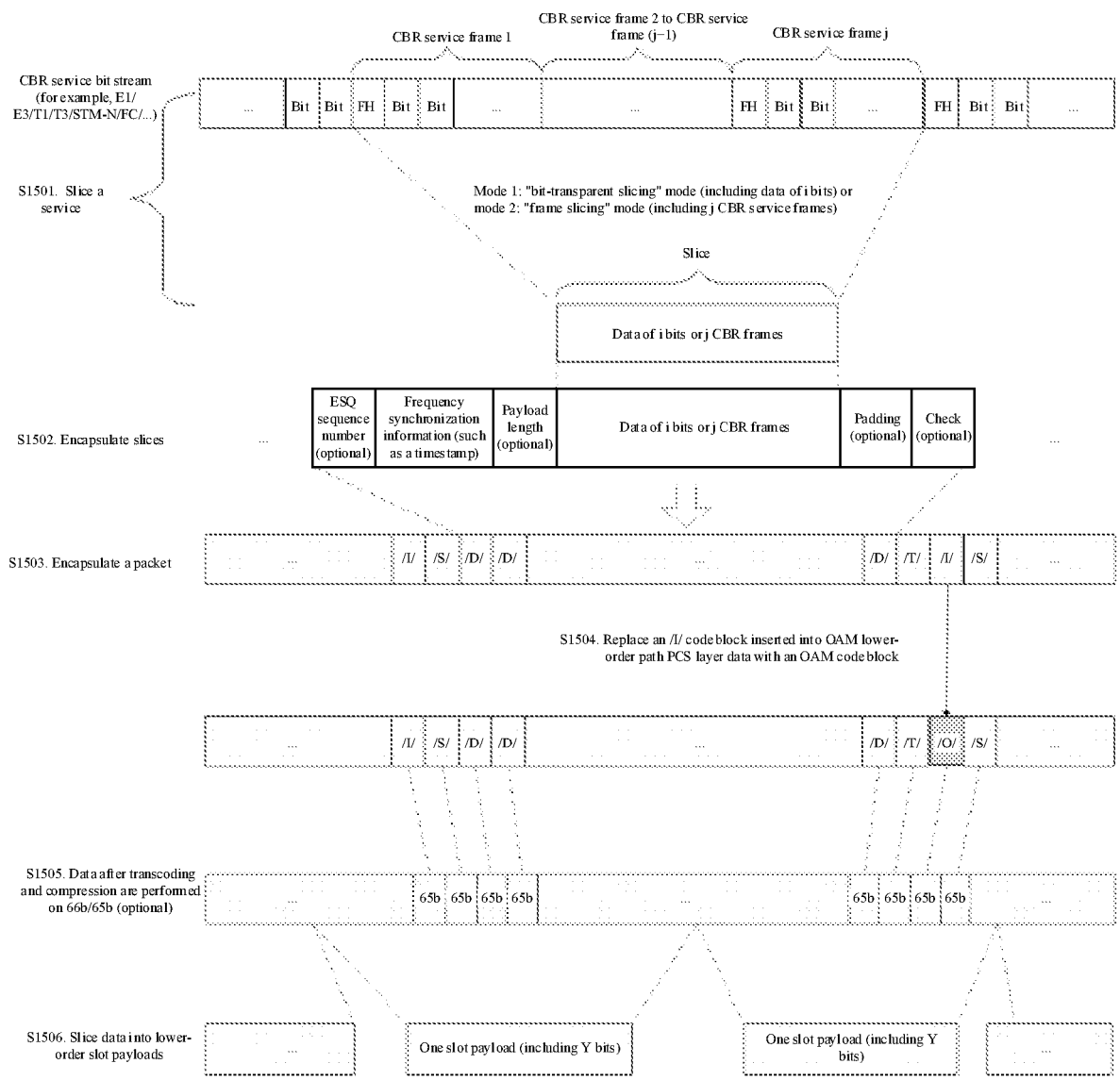
FIG. 15 is a schematic flowchart of another specific method for obtaining a sub-client sub-slot payload of a CBR service according to this application.

FIG. 15 is a schematic diagram of a method for obtaining a sub-client sub-slot payload of a CBR service according to this application. The method 1500 may be specifically used to implement the method 200. The method 1500 includes the following steps.

S1501. Slice CBR service data to obtain a plurality of pieces of CBR service slice data corresponding to service slices shown in FIG. 15. The slicing mode is the mode 1 or mode 2 described above.

S1502. Encapsulate a slice data block.

Encapsulation information includes one or more of the following information:

OAM information (optional), used for fault detection and protection operations at a lower-order path layer of the CBR;

a sequence number (optional);

clock frequency information, used to transmit clock information (such as a timestamp) of the service;

payload length and padding, optional, where if an encapsulated service slice is less than a lower-order slot payload length, data padding is required and an effective payload length is identified; and a check field, optional, used to perform a bit error check on slice data, where the check function may alternatively be performing the check by using OAM.

S1503. Encapsulate an encapsulated CBR service slice into an Ethernet packet, and add a frame boundary (for example, an /S/ code block and a /T/ code block shown in FIG. 15) and frame gap encapsulation (for example, an /I/ code block shown in FIG. 15) to obtain a coded Ethernet code block stream. Each encapsulated CBR service slice is used as a data code block of an Ethernet data stream. A specific operation of this step is similar to that of existing Ethernet packet processing. Details are not described herein again.

S1504. Insert a lower-order path layer OAM code block into the Ethernet code block stream encoded by a PCS. The OAM code block is used to transmit OAM information.

In a specific implementation, the OAM information may be, for example, an OAM message. Refer to an MTN path layer OAM format defined in the ITU G.MTN standard.

S1505. Optionally, perform transcoding and compression on a 64b/66b code block stream into which an OAM message is inserted.

In a specific implementation, the compressed code block stream includes a plurality of 64b/65b code blocks. In a specific implementation, the compressed code block stream includes a plurality of 256b/257b code blocks.

Performing transcoding and compression on the code block stream can improve efficiency of carrying data in a lower-order path. A transcoding algorithm may be 256b/257b transcoding. FIG. 12 shows only 64b/65b transcoding. Because 256b/257b transcoding is originally similar, details are not described again.

S1506. Slice, based on a length (Y bits) of each sub-client sub-slot payload, the Ethernet service data stream (which may also be referred to as a code block stream) into which the OAM code block is inserted. The length of each sub-client sub-slot payload may be Z 64B/66B code blocks. If transcoding and compression are performed before the slicing, the length may alternatively be Z transcoded 64B/65B code blocks or Z transcoded 256B/257B code blocks. Y and Z are both integers.

Each slice obtained by performing the slicing operation in S1056 is encapsulated into a base frame payload as a sub-client sub-slot payload. For the base frame payload and the related format of the base frame, refer to the foregoing description. Details are not described herein again.

Figure 16:
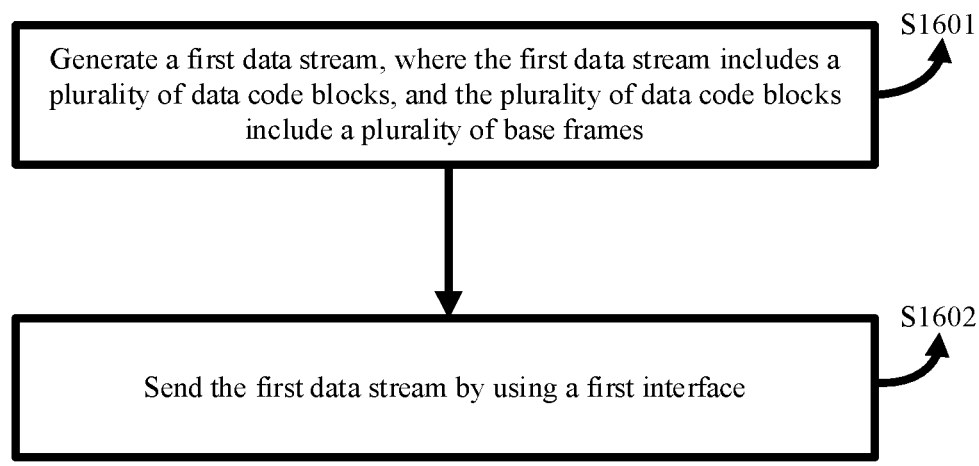
FIG. 16 is a schematic diagram of a data transmission method according to this application.

The foregoing describes the base frame encapsulation format and encapsulation process provided in this application, and also describes the method for obtaining a sub-client sub-slot payload of an Ethernet service or a sub-client sub-slot payload of a CBR service. On this basis, a data transmission method 1600 provided in this application is described with reference to FIG. 16. The method is performed by a first communications apparatus, and the first communications apparatus includes a first interface. The method includes the following steps.

S1601. Generate a first data stream, where the first data stream includes a plurality of data code blocks.

Specifically, the plurality of data code blocks include a plurality of first base frames, each first base frame includes a base frame payload, the base frame payload includes a base frame overhead and a plurality of sub-client sub-slot payloads, the plurality of sub-client sub-slot payloads include a plurality of first sub-client sub-slot payloads, and the plurality of first sub-client sub-slot payloads include service data of a first sub-client interface.

S1602. Send the first data stream by using the first interface.

In S1602, for an encapsulation format and an encapsulation process of each base frame, refer to the foregoing detailed descriptions. Details are not described herein again.

In a specific implementation, the first interface is divided into M sub-slots in time domain. M is an integer greater than 1. To carry more low-rate services, a slot bandwidth of each of the M sub-slots is P. Preferably, P is less than 5 gigabit/s Gbp/s. More preferably, P is less than or equal to 1 Gbp/s. More preferably, P is less than or equal to 500 Mbp/s. For example, to carry an ATM service, P is preferably less than or equal to 100 Mbp/s. For a specific value of M, refer to the foregoing description. Details are not described herein again.

In a specific implementation, the first interface is logically divided into Z sub-client interfaces, and the Z sub-client interfaces include the first sub-client interface.

In a specific implementation, the first interface is a FlexE client interface. The first communications apparatus further includes a first FlexE interface on a transmitting side, and S1602 specifically includes:

sending the first data stream by using the first FlexE interface based on a slot mapping relationship between the first FlexE client interface and the first FlexE interface, where the first FlexE interface is logically divided into a plurality of FlexE client interfaces, and the plurality of FlexE client interfaces include the first FlexE client interface.

In a specific implementation, the first interface is the first FlexE client interface.

In a specific implementation, the first interface is an Ethernet interface.

In a specific implementation, the first data stream is used to carry an Ethernet service.

In a specific implementation, when the first data stream is used to carry the Ethernet service, the generating a first data stream in S1601 includes:

obtaining a first Ethernet service data stream from a PCS;

slicing the first Ethernet service data stream to obtain a plurality of Ethernet service slices; and encapsulating the plurality of Ethernet service slices into the base frame payload as the plurality of sub-client sub-slot payloads.

For specific implementations of the foregoing steps, refer to detailed descriptions of the method 100 with reference to FIG. 12. Details are not described herein.

In a specific implementation, the first data stream is used to carry a CBR service.

When the first data stream is used to carry the CBR service, the generating a first data stream in S1601 includes:

In a specific implementation, the method 1600 further includes: slicing a first CBR service data stream to obtain a plurality of pieces of CBR service slice data, where the first CBR service data stream includes a plurality of CBR service frames;

separately slicing and encapsulating the plurality of pieces of CBR service slice data to obtain a plurality of CBR service slices, where each CBR service slice includes the CBR service slice data and encapsulation information;

obtaining the plurality of sub-client sub-slot payloads based on the plurality of CBR service slices; and encapsulating the plurality of sub-client sub-slot payloads into the base frame payload.

In a specific implementation, a slice granularity of each CBR service slice is i bits, content of the plurality of CBR service frames is not identified when the first CBR service data stream is sliced, and i is an integer.

In a specific implementation, a slice granularity of each CBR service slice is j complete CBR service frames, and j is an integer greater than or equal to 1.

In a specific implementation, the CBR service slice includes a first field used to carry the CBR service slice data.

In a specific implementation, the encapsulation information includes a second field, and the second field is used to carry clock frequency information.

In a specific implementation, the encapsulation information includes a third field, and the third field is used to carry operation, administration and maintenance OAM information.

In a specific implementation, the encapsulation information includes a fourth field, and the fourth field is used to carry a sequence number of the CBR service slice.

In a specific implementation, the sequence number of the CBR service slice is used for slice reassembly.

In a specific implementation, the encapsulation information includes a fifth field, the fifth field is used to carry payload length information, and the payload length information is an effective length of the CBR service slice data carried in each CBR service slice.

In a specific implementation, the encapsulation information includes a sixth field, and the sixth field is a padding field.

In a specific implementation, the encapsulation information includes a seventh field, and the seventh field is used to carry check information.

In a specific implementation, the obtaining the plurality of sub-client sub-slot payloads based on the plurality of CBR service slices includes:

performing Ethernet packet encapsulation on the plurality of CBR service slices to obtain a second data stream, where the second data stream includes a plurality of code blocks; and slicing the second data stream based on a length of each sub-client sub-slot payload to obtain the plurality of sub-client sub-slot payloads.

In a specific implementation, the second data stream includes a plurality of 64b/66b code blocks, a plurality of 64b/65b code blocks, or a plurality of 256b/257b code blocks.

In a specific implementation, the first data stream includes a plurality of OAM code blocks used to carry OAM information.

In a specific implementation, the obtaining the plurality of sub-client sub-slot payloads based on the plurality of CBR service slices includes:

directly using each CBR service slice as a sub-client sub-slot payload.

In a specific implementation, the first data stream includes a plurality of 64b/66b code blocks, a plurality of 64b/65b code blocks, or a plurality of 256b/257b code blocks.

It should be noted that, for a specific process of slicing and encapsulating the CBR service data stream and obtaining the plurality of sub-client sub-slot payloads, reference may be made to related descriptions in the method 200, the method 1400, and the method 1500 corresponding to FIG. 13 to FIG. 15. Details are not described herein again.

In a specific implementation, the method further includes: receiving, by the first communications apparatus, a first sub-client sub-slot mapping table sent by a second communications apparatus, where the first sub-client sub-slot mapping table is used to indicate a first mapping relationship between the M sub-slots and the Z sub-client interfaces, and each sub-client interface is mapped to at least one of the M sub-slots; and saving the first sub-client sub-slot mapping table.

In a specific implementation, the first sub-client sub-slot mapping table indicates the first mapping relationship by mapping Z sub-user identifiers sub-client IDs to M sub-slot identifiers sub-slot IDs, the Z sub-client IDs are used to indicate the Z sub-client interfaces, and the M sub-slot IDs are used to indicate the M sub-slots.

In a specific implementation, the second communications apparatus may be a control management device or a forwarding apparatus that performs data communication with the first communications apparatus. The control management device may be, for example, a network management device or a controller. The forwarding apparatus may be, for example, an apparatus for forwarding, such as a router, a switch, a firewall, a packet transmission network PTN device, or a board in a network device.

In a specific implementation, the first sub-client sub-slot mapping table is carried in the base frame overhead; or the first sub-client sub-slot mapping table is carried in a specified sub-slot among the M sub-slots.

In a specific implementation, the sub-client sub-slot mapping table provided in this application includes sub-slot numbers and sub-client numbers, and each sub-client may be mapped to a plurality of sub-slots. The foregoing "mapped" may also be understood as configured or occupied. In other words, each sub-client sends data by using a plurality of mapped sub-slots. Based on a same sub-client sub-slot mapping table, a transmit end and a receive end in communication send and restore (or demap) data transmitted in corresponding sub-slots.

Figure 17:
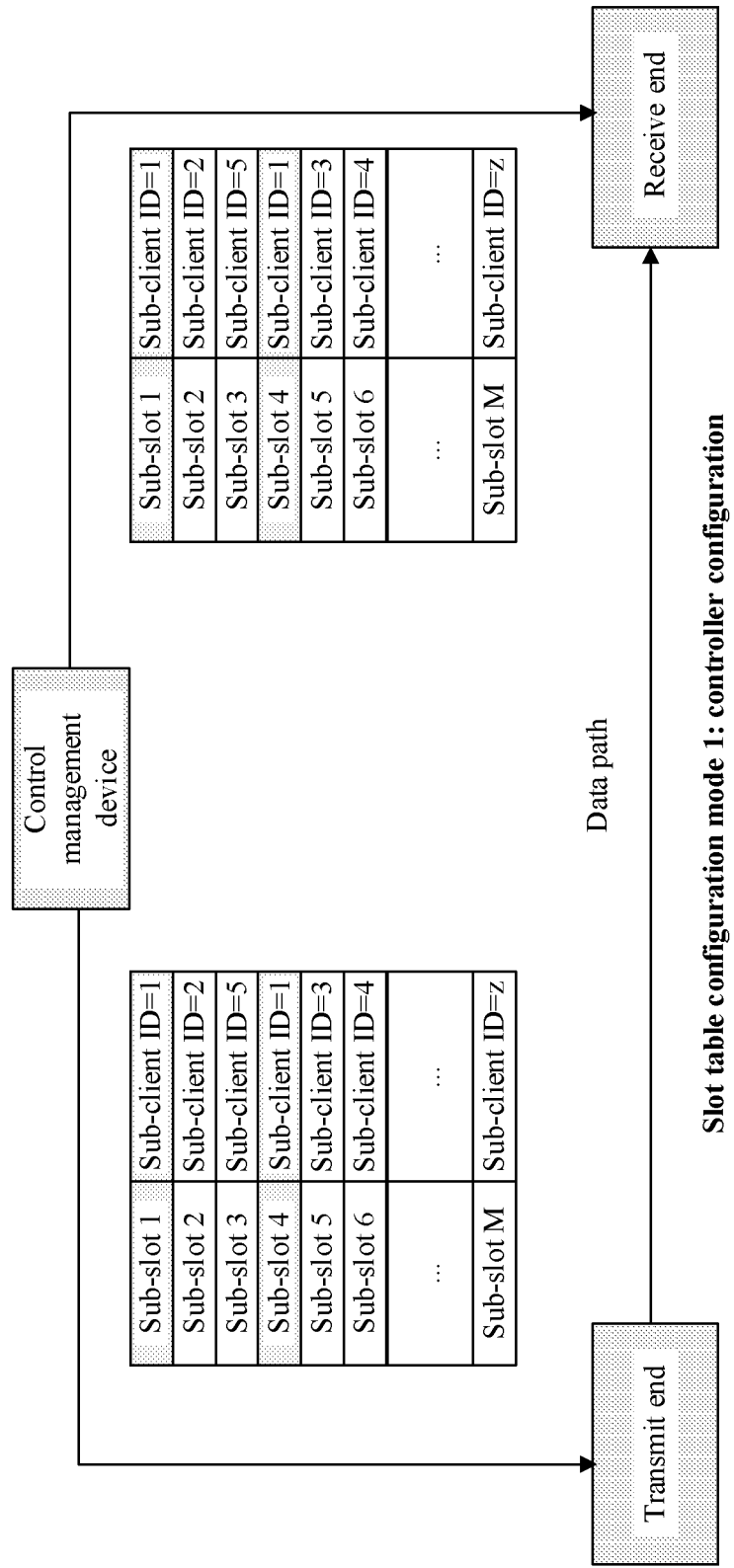
FIG. 17 is a schematic diagram of a method for configuring a sub-client sub-slot mapping table according to this application.
Figure 18:
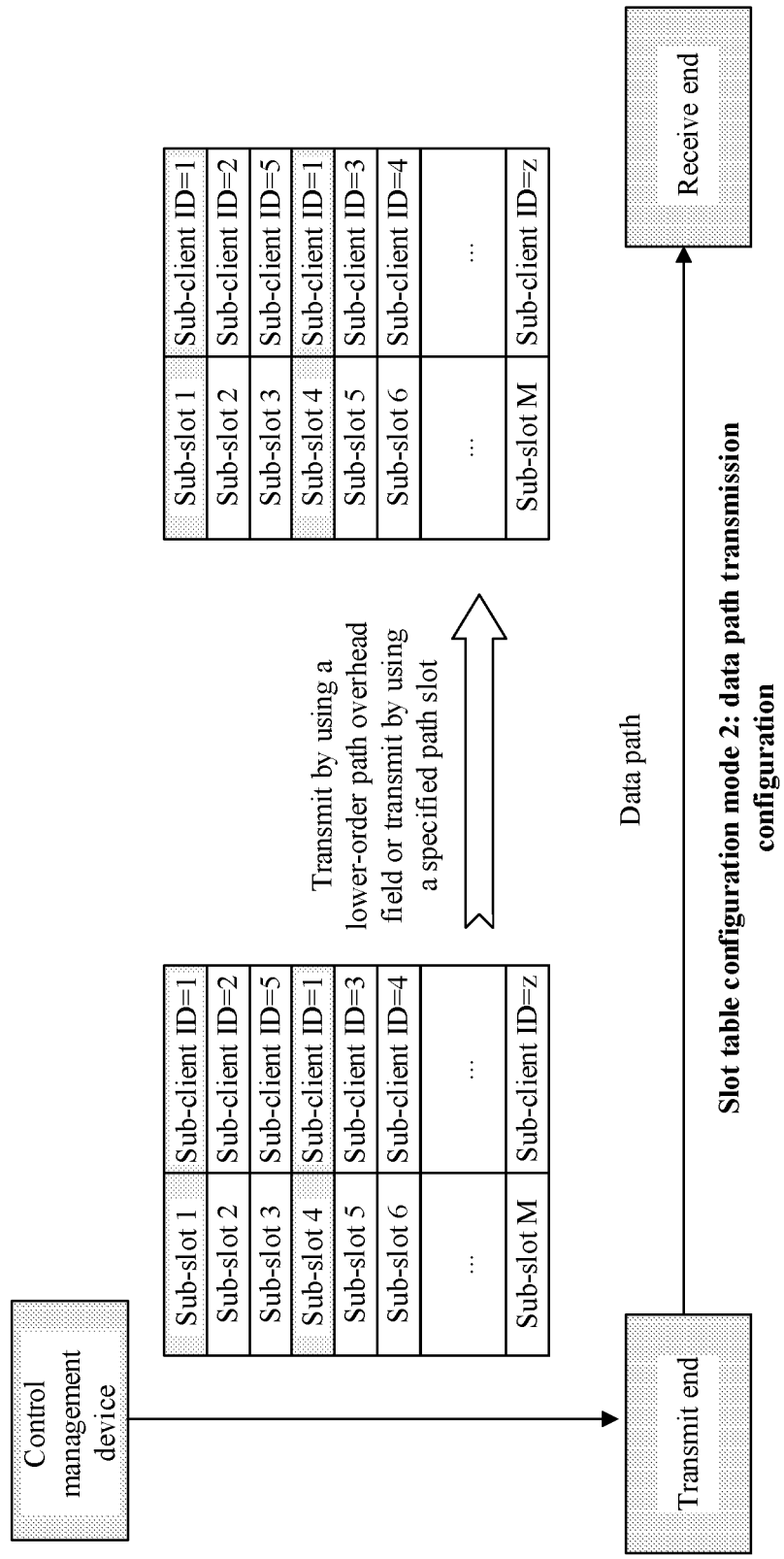
FIG. 18 is a schematic diagram of another method for configuring a sub-client sub-slot mapping table according to this application.

With reference to FIG. 17 and FIG. 18, the following uses examples to describe a flowchart of a method for obtaining the first sub-client sub-slot mapping table by the first communications apparatus.

FIG. 17 is a schematic diagram of a method for configuring a sub-client sub-slot mapping table based on a control management device according to this application. As shown in FIG. 17, both a receive end and a transmit end in communication are configured by a control management device.

FIG. 18 is a schematic diagram of a method for configuring a sub-client sub-slot mapping table based on a data path according to this application. As shown in FIG. 17, the control management device configures only the sub-client sub-slot mapping table of the transmit end, and the transmit end transmits the sub-client sub-slot mapping table to the receive end through a data path. The sub-client sub-slot mapping table may be transmitted in the data path by using a slot table transmission path defined in a base frame overhead, or a specific sub-slot among M sub-slots may be specified for transmission. In a case of a FlexE interface, the sub-client sub-slot mapping table may alternatively be transmitted by using a FlexE overhead. A mode of transmitting the sub-client sub-slot mapping table in the data path is not specifically limited in this application.

In the method corresponding to FIG. 17, the first communications apparatus may be a transmit end apparatus or may be a receive end apparatus. In the method corresponding to FIG. 18, the first communications apparatus is used as a receive end apparatus.

In a specific implementation, the first sub-client interface is mapped to W sub-slots of the first interface, and the generating a first data stream includes:

respectively mapping the plurality of first sub-client sub-slot payloads to the W sub-slots, where W is an integer greater than 1.

In a specific implementation, the respectively mapping the plurality of first sub-client sub-slot payloads to the W sub-slots includes:

scheduling the W sub-slots sequentially based on a mapping relationship between the first sub-client interface and the W sub-slots and based on a slot scheduling period of the first interface, where the mapping relationship between the first sub-client interface and the W sub-slots may be determined based on the first sub-client sub-slot mapping table.

In a specific implementation, the first communications apparatus includes a second sub-client interface on a receiving side, and the generating a first data stream includes:

obtaining a plurality of second sub-client sub-slot payloads of the second sub-client interface;

processing the plurality of second sub-client sub-slot payloads based on a sub-slot cross-connection relationship between the second sub-client interface and the first sub-client interface to obtain the plurality of first sub-client sub-slot payloads; and encapsulating the plurality of first sub-client sub-slot payloads into the base frame payload.

For detailed about this implementation, refer to the following detailed descriptions of an intermediate slot cross-connect device NE 2 in FIG. 20A, FIG. 20B, and FIG. 20C to FIG. 23A, FIG. 23B, and FIG. 23C.

In a specific implementation, the obtaining a plurality of second sub-client sub-slot payloads of the second sub-client interface includes:

obtaining a third data stream of a second interface on the receiving side, and demapping the plurality of second sub-client sub-slot payloads from the third data stream based on a second sub-client sub-slot mapping table, where the second interface is divided into A sub-slots in time domain, the second interface is logically divided into B sub-client interfaces, the B sub-client interfaces include the second sub-client interface, the second sub-client sub-slot mapping table is used to indicate a second mapping relationship between the A sub-slots and the B sub-client interfaces, and both A and B are integers.

The third data stream corresponds to a higher-order path in the intermediate slot cross-connect device NE 2 in FIG. 20A, FIG. 20B, and FIG. 20C to FIG. 23A, FIG. 23B, and FIG. 23C, that is, a data stream obtained from a client interface or an Ethernet interface.

In a specific implementation, the second interface is an Ethernet interface.

In a specific implementation, the second interface is a second FlexE client interface.

In a specific implementation, the first communications apparatus further includes a second FlexE interface on the receiving side, and the obtaining a third data stream includes:

obtaining a fourth data stream of the second FlexE interface, where the second FlexE interface is logically divided into a plurality of FlexE client interfaces, and the plurality of FlexE client interfaces include the second FlexE client interface; and demapping the third data stream from the fourth data stream based on a slot mapping relationship between the second FlexE client interface and the second FlexE interface, where the third data stream includes a plurality of second base frames, and the plurality of second base frames include the plurality of second sub-client sub-slot payloads.

The second FlexE interface may be, for example, a receive-side FlexE interface shown in FIG. 20A, FIG. 20, and FIG. 20C, or FIG. 21A, FIG. 21B, and FIG. 21C. The fourth data stream is a data stream obtained by the receive-side FlexE interface. The third data stream may be, for example, a data stream corresponding to a higher-order path client-1 shown in FIG. 21A, FIG. 21B, and FIG. 21C, or FIG. 22A, FIG. 22B, and FIG. 22C.

Figure 19:
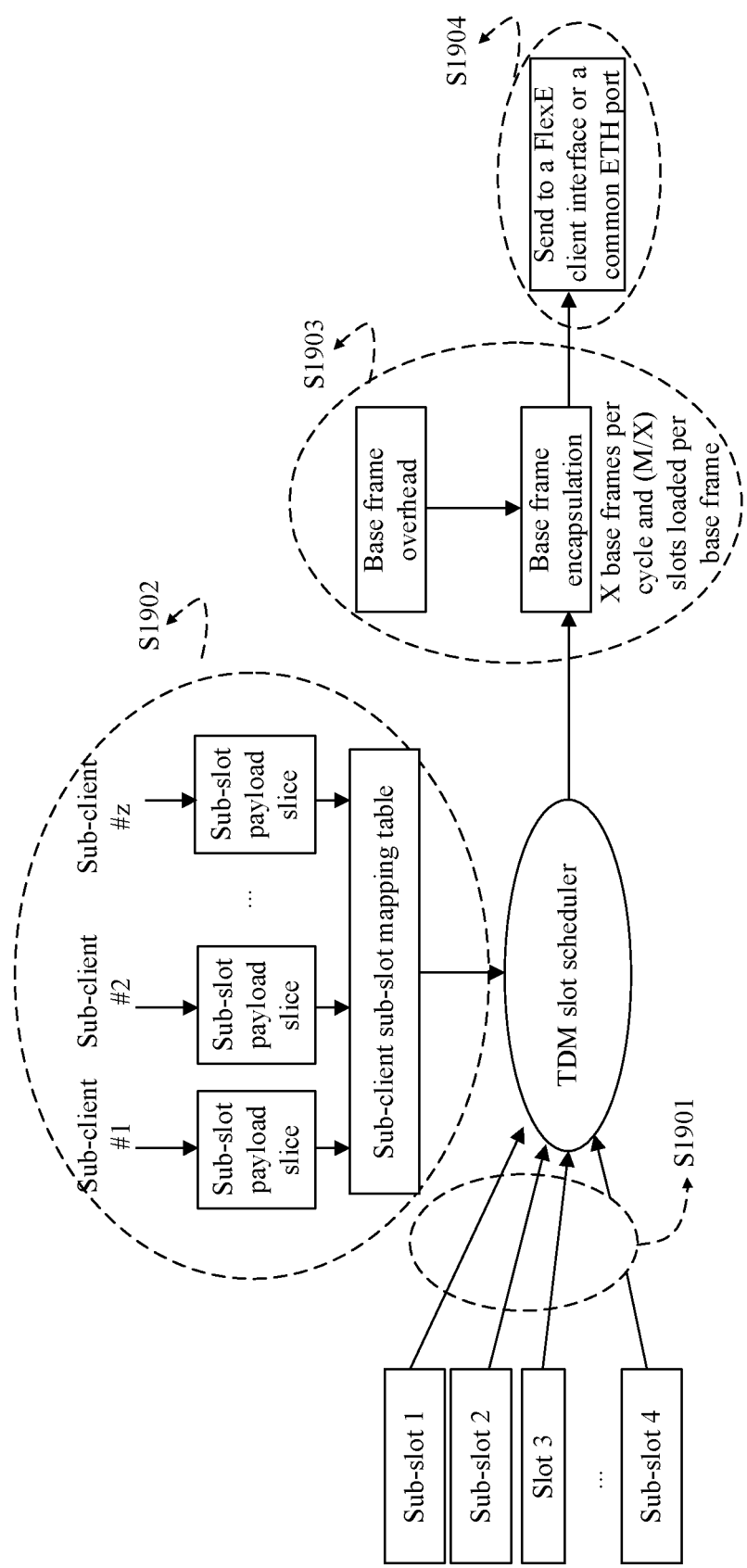
FIG. 19 is a schematic diagram of a method for sending a sub-client service data stream according to this application.

With reference to FIG. 19, the following uses an example to describe a specific method 1900 for sending the first data stream by using the first interface in the method 1600 provided in this application.

S1901. Schedule M sub-slots sequentially. A first interface (FlexE client interface or common ETH interface) configures a TDM slot scheduler at a transmit end by using a FlexE sub-shim layer and schedules M sub-slots sequentially. The TDM slot scheduler uses the M sub-slots obtained by dividing the first interface, as one slot scheduling period for cyclic scheduling.

S1902. Respectively map, based on a sub-slot scheduling sequence and based on a first sub-client sub-slot mapping table, a plurality of different sub-client sub-slot payloads included in the first data stream to sub-slots corresponding to corresponding sub-client interfaces.

S1903. Perform base frame encapsulation. In a specific implementation, M sub-slots are evenly distributed in X base frames. Therefore, one base frame is encapsulated every time M/X sub-slots are scheduled. For the process of base frame encapsulation, refer to the foregoing detailed description. Details are not described herein again.

S1904. Send, by using the first interface, the first data stream including a plurality of base frames.

In the foregoing method 1600, because a sub-slot payload and a base frame overhead of each sub-client are encapsulated into a base frame payload, and during Ethernet service mapping, are encapsulated into a /D/ code block as a data code block, even a common Ethernet interface that does not support a standard FlexE mode can implement bandwidth isolation on the interface by using the method provided by this application. According to the method provided in this application, a base frame format is reconstructed. Therefore, regardless of an Ethernet interface or a flexible Ethernet interface, small bandwidths at various rates can be further flexibly configured in a large bandwidth. A plurality of flexible bandwidth allocation solutions can be provided for low-rate services with different rates. This greatly improves bandwidth utilization.

Figure 20A:
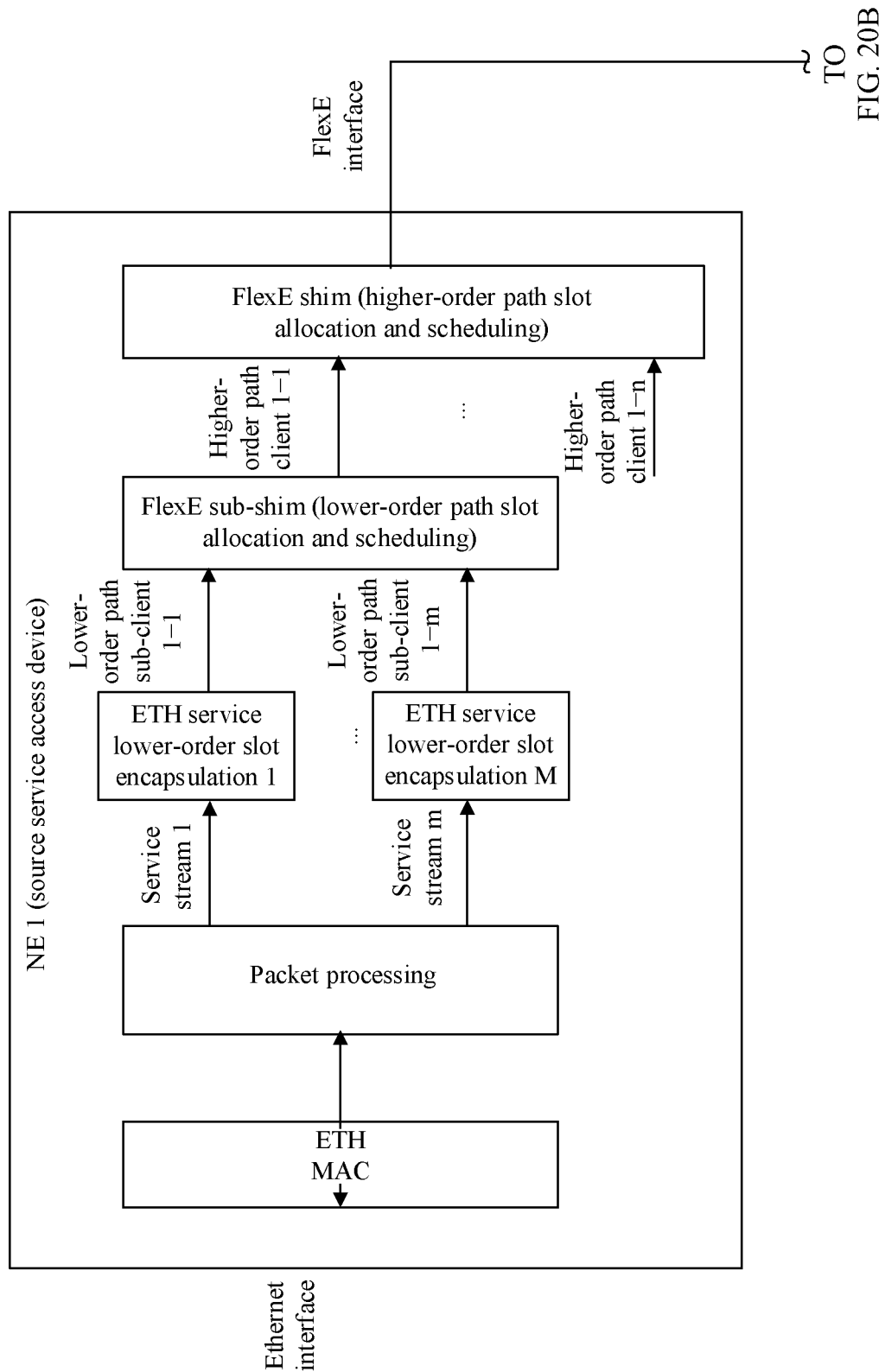
FIG. 20A, FIG. 20B, and FIG. 20C are a schematic diagram of a method for transmitting an Ethernet service based on a FlexE interface according to this application.
Figure 20B:
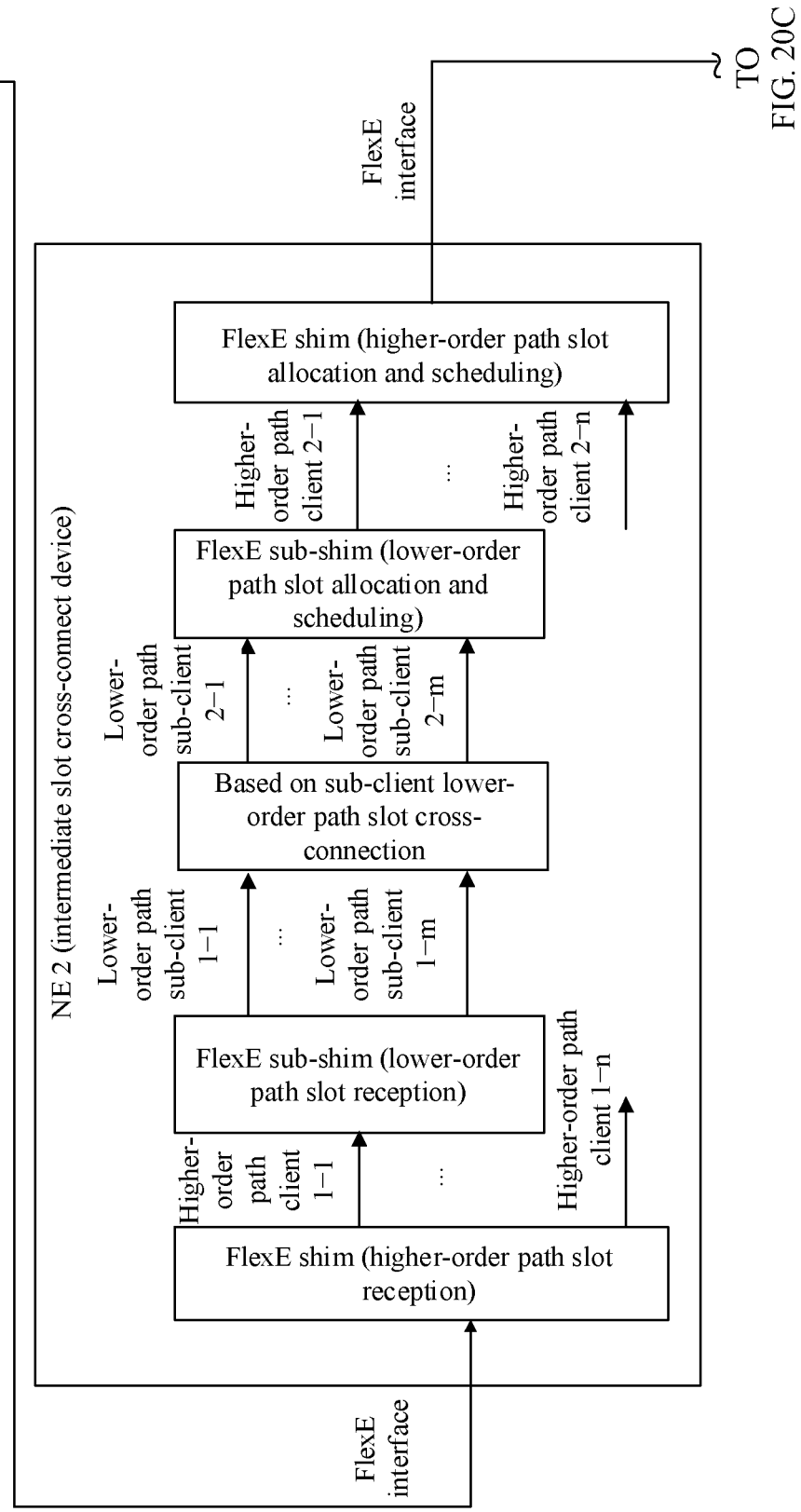
Figure 20C:
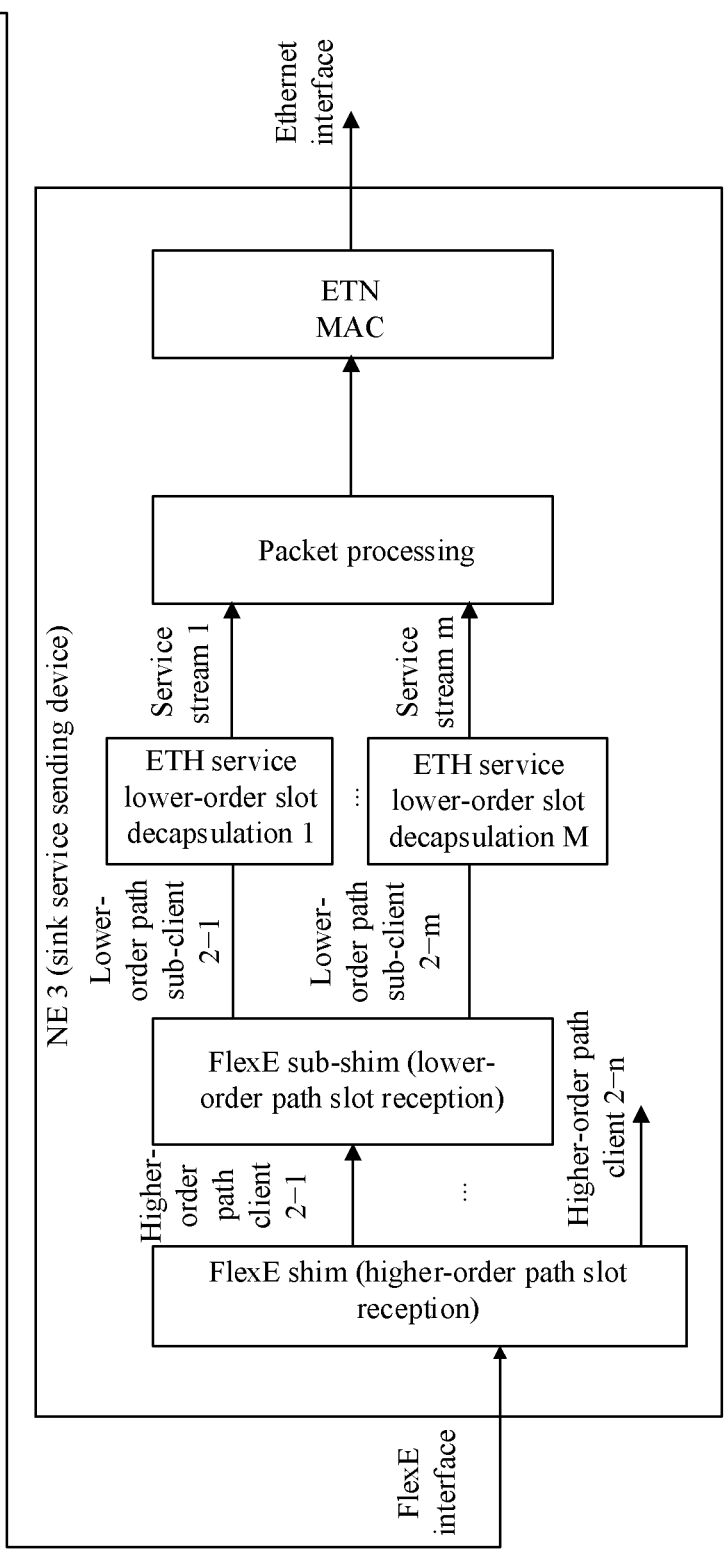
Figure 21A:
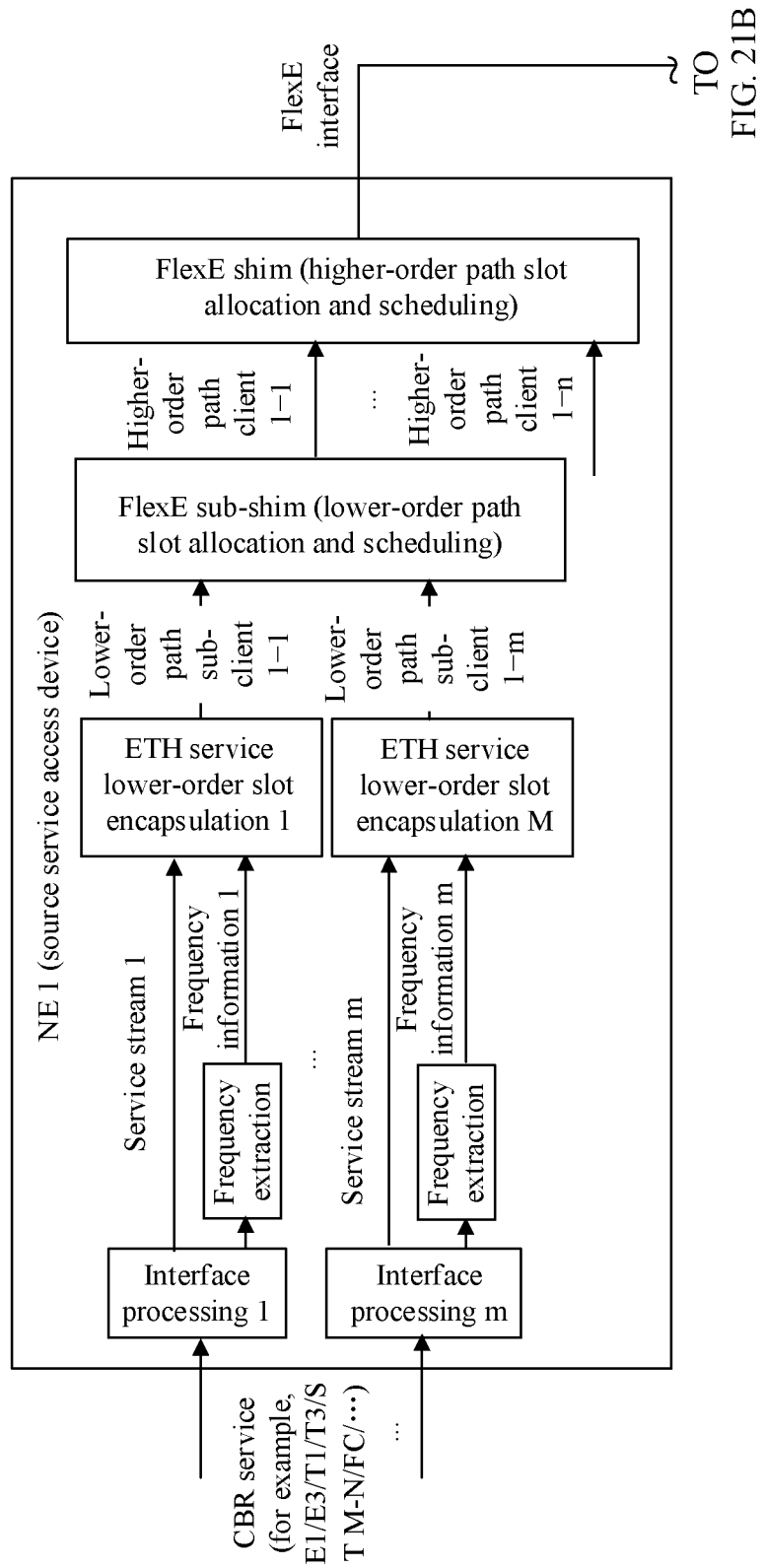
FIG. 21A, FIG. 21B, and FIG. 21C are a schematic diagram of a method for transmitting a CBR service based on a FlexE interface according to this application.
Figure 21B:
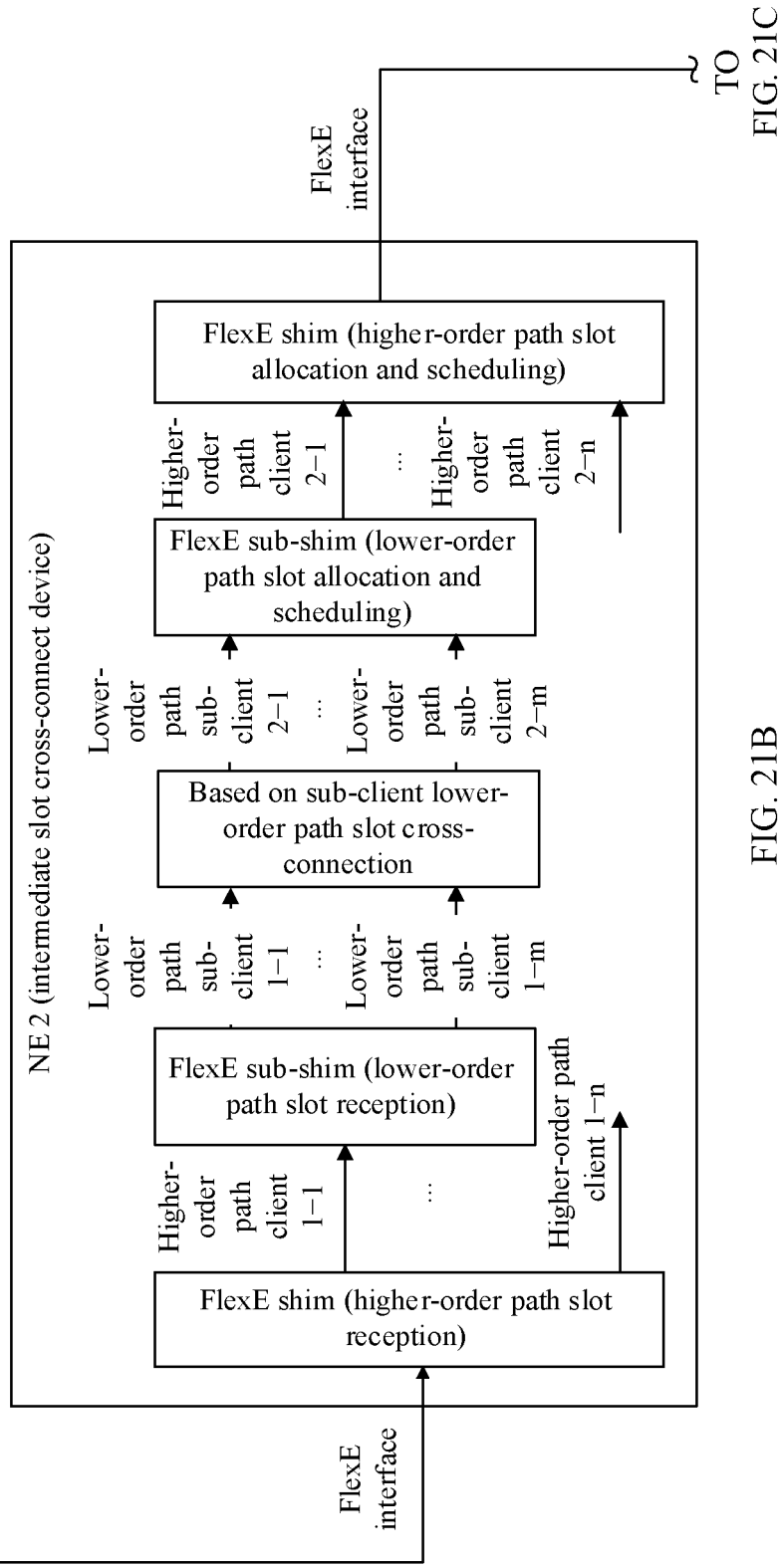
Figure 21C:
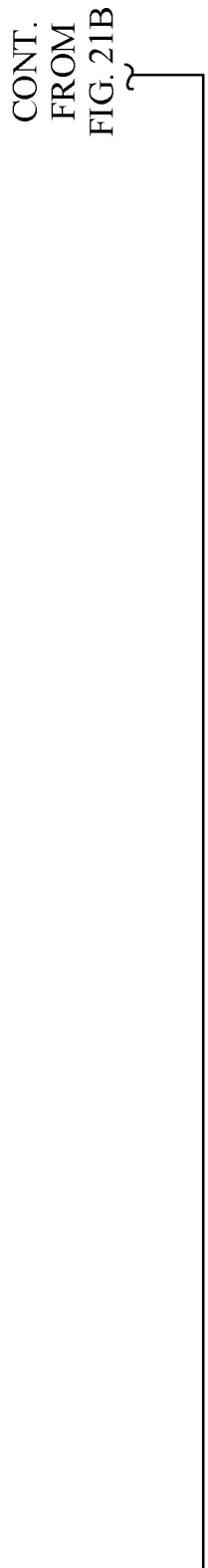
Figure 22A:
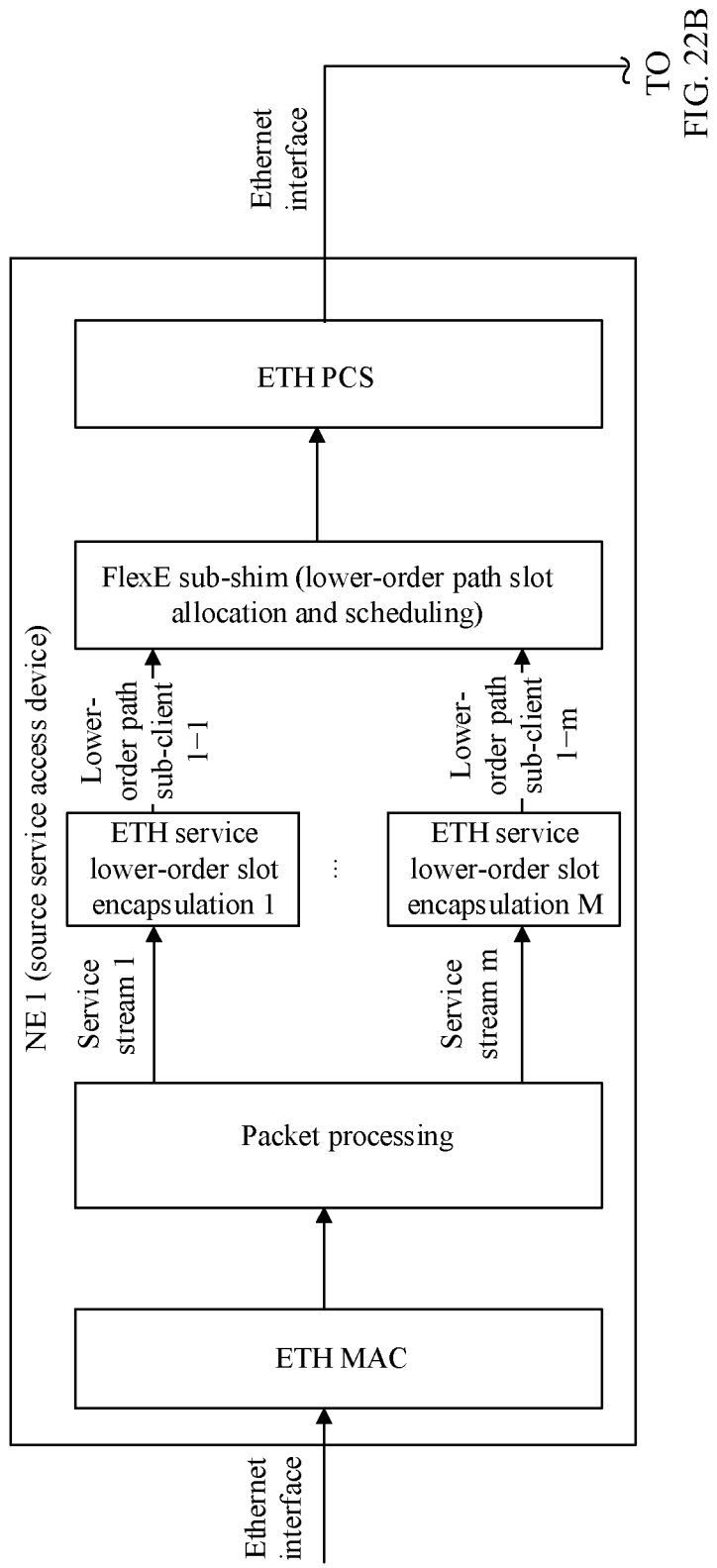
FIG. 22A, FIG. 22B, and FIG. 22C are a schematic diagram of a method for transmitting an Ethernet service based on an Ethernet interface according to this application.
Figure 22B:
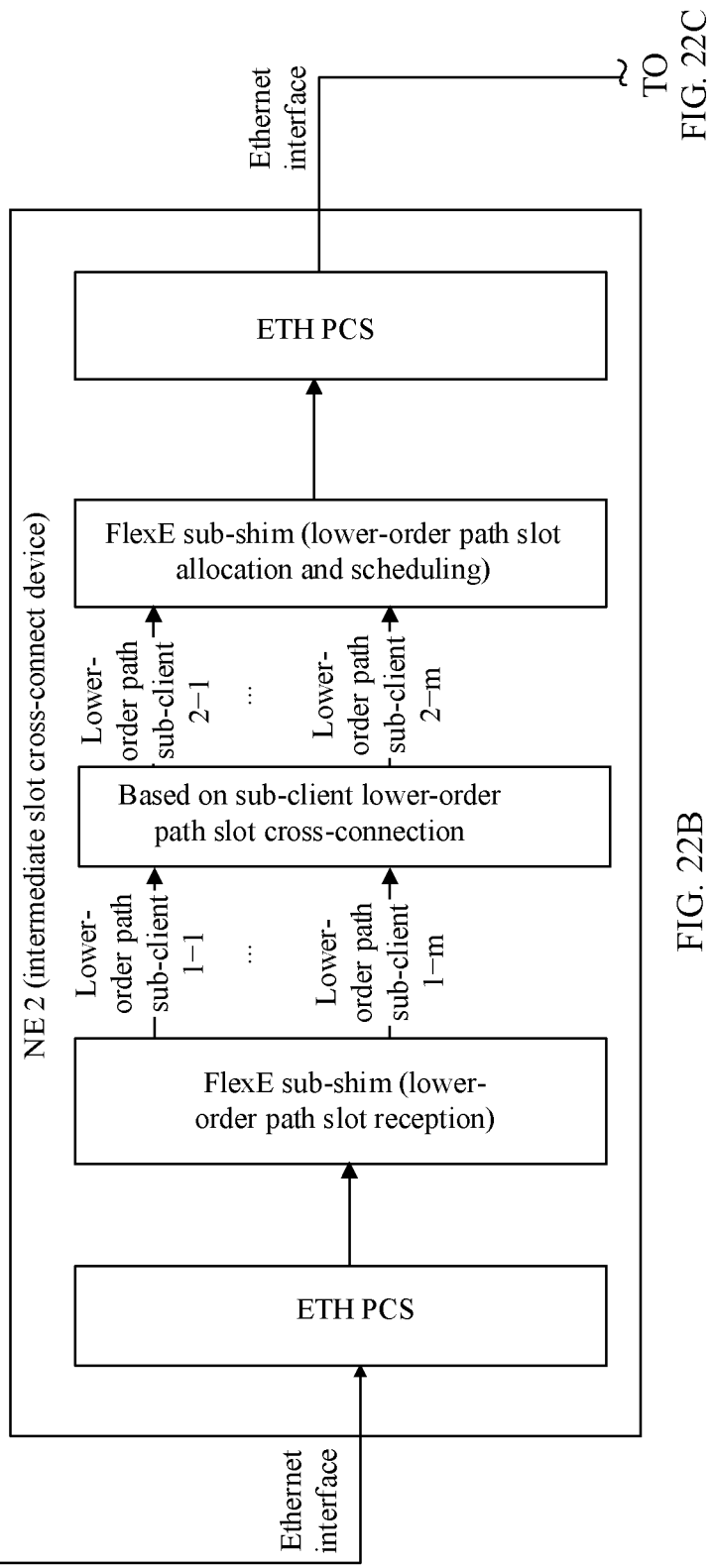
Figure 22C:
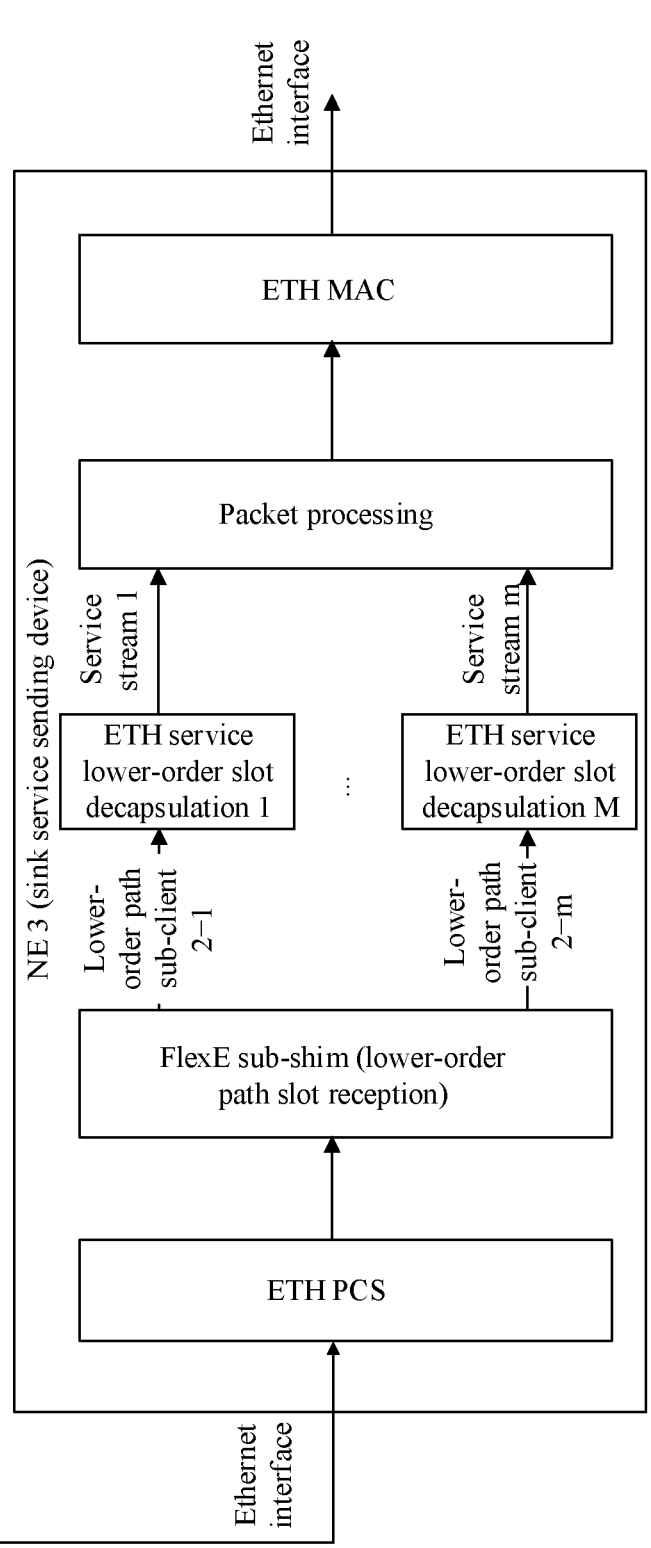
Figure 23A:
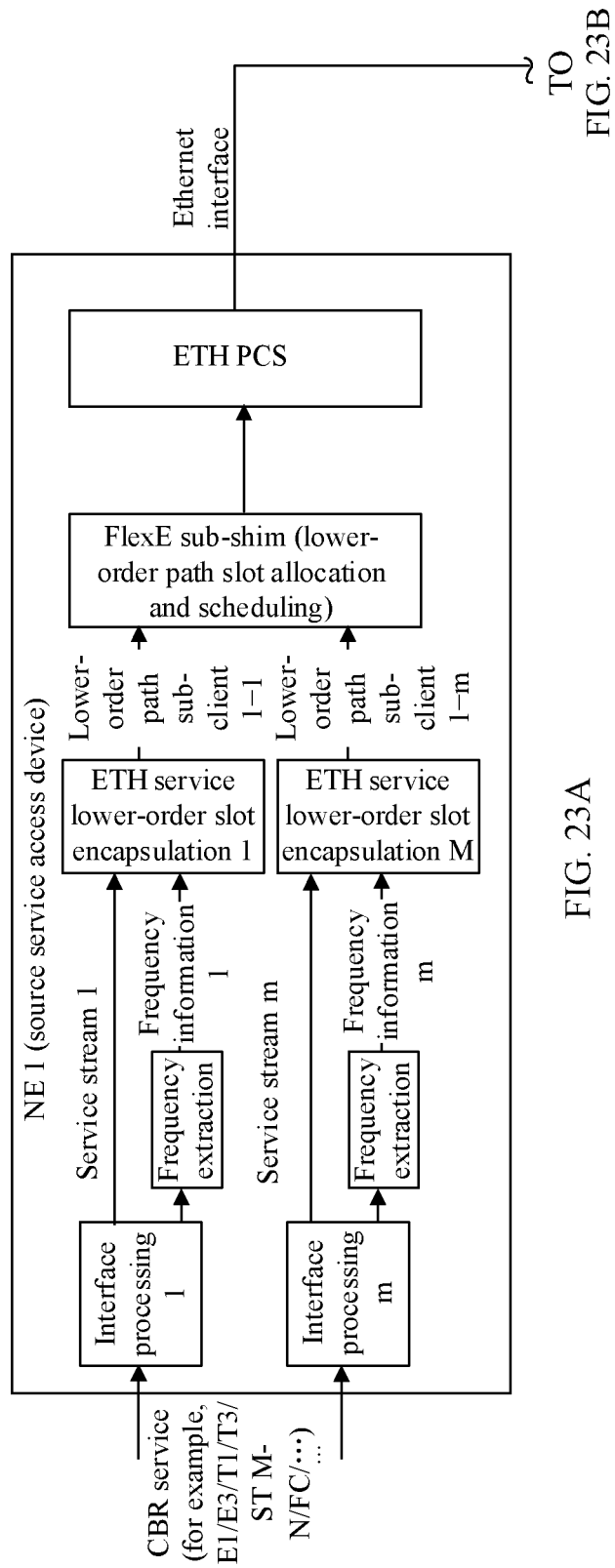
FIG. 23A, FIG. 23B, and FIG. 23C are a schematic diagram of a method for transmitting a CBR service based on an Ethernet interface according to this application.
Figure 23B:
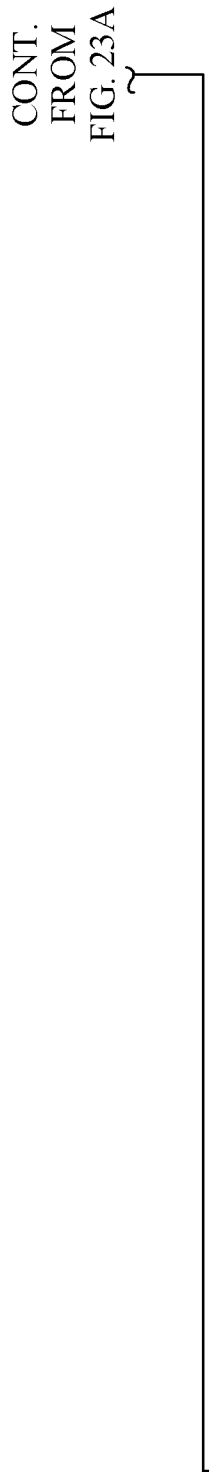
Figure 23C:
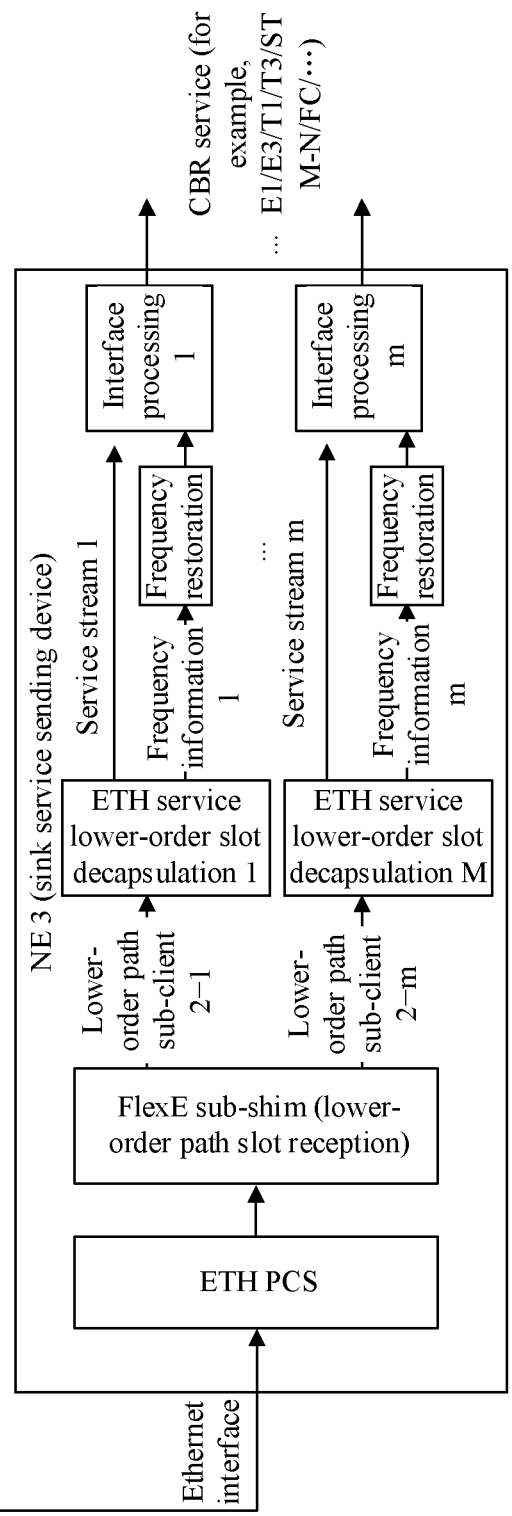

In the method 1600, the first interface may be an Ethernet interface or a flexible Ethernet interface, and may be used to carry a common Ethernet service, or may be used to carry a CBR service. Application scenarios of the technical solution are extensive. The following uses specific examples to describe the application scenarios of the method 1600 with reference to FIG. 20A, FIG. 20B, and FIG. 20C to FIG. 23A, FIG. 23B, and FIG. 23C. FIG. 20A, FIG. 20B, and FIG. 20C are a schematic flowchart of a method for transmitting an Ethernet service based on a FlexE interface. FIG. 21A, FIG. 21B, and FIG. 21C are a schematic flowchart of a method for transmitting a CBR service based on a FlexE interface. FIG. 22A, FIG. 22B, and FIG. 22C are a schematic flowchart of a method for transmitting an Ethernet service based on an Ethernet interface. FIG. 23A, FIG. 23B, and FIG. 23C are a schematic diagram of a method for transmitting a CBR service based on an Ethernet interface. In FIG. 20A, FIG. 20B, and FIG. 20C to FIG. 23A, FIG. 23B, and FIG. 23C, the first communications apparatus in this application may be a source service access device NE 1, an intermediate slot cross-connect device NE 2, or a sink service sending device NE 3 shown in any one of FIG. 20A, FIG. 20B, and FIG. 20C to FIG. 24. Alternatively, the first communications apparatus may be a board in a source service access device NE 1, an intermediate slot cross-connect device NE 2, or a sink service sending device NE 3, and is configured to perform one or more operations in the methods corresponding to FIG. 20A, FIG. 20B, and FIG. 20C to FIG. 23A, FIG. 23B, and FIG. 23C.

With reference to FIG. 20A, FIG. 20B, and FIG. 20C, the following briefly describes a method for transmitting an Ethernet service based on a FlexE interface. As shown in FIG. 20A, FIG. 20B, and FIG. 20C, a FlexE-based communications network includes three types of devices: a source service access device NE 1, an intermediate slot cross-connect device NE 2, and a sink service sending device NE 3.

Source service access device NE 1: A receiving side is an Ethernet interface, and a transmitting side is a FlexE port. After the receive-side port receives an Ethernet packet, receiving sidepacket layer service processing (such as VLAN, IP, MPLS, and SR) is completed first; and then different service streams are mapped to corresponding lower-order paths (that is, the sub-client interfaces in this application, corresponding to a sub-client 1-1, . . . , sub-client i-m shown in FIG. 20A, FIG. 20B, and FIG. 20C) according to an Ethernet slot mapping process, then loaded to higher-order paths (that is, the FlexE client interfaces in this application, corresponding to a client 1-1, . . . , a client 1-n shown in FIG. 20A, FIG. 20B, and FIG. 20C), and finally sent out from the FlexE interface. For the foregoing process, refer to related descriptions of the method wo corresponding to FIG. 12. First, each sub-client sub-slot payload is generated; then based on the method corresponding to FIG. 19 and based on a sub-client sub-slot mapping table, each sub-client sub-slot payload is mapped by a TDM slot scheduler to each sub-slot corresponding to each sub-client; and then a corresponding base frame is encapsulated and sent out from a corresponding Flex-client interface. A mapping process between each Flex-client interface and a corresponding FlexE interface is an existing implementation and is not described in detail herein.

Intermediate slot cross-connect device NE 2: Both a receiving side and a transmitting side are FlexE interfaces. First, the streams received from the FlexE higher-order paths (that is, the FlexE client interfaces in this application, corresponding to the client 1-1, . . . , the client i-n shown in FIG. 20A, FIG. 20B, and FIG. 20C) are demapped from the higher-order paths to lower-order path (that is, the sub-client interfaces in this application, corresponding to the sub-client 1-1, . . . , the sub-client 1-m shown in FIG. 21A, FIG. 21B, and FIG. 21C) slots based on a sub-client sub-slot table; then lower-order slot cross-connection is performed to cross-connect the service streams to outgoing lower-order paths (that is, the sub-client interfaces in this application, corresponding to a sub-client 2-1, . . . , a sub-client 2-m shown in FIG. 20A, FIG. 20B, and FIG. 20C); and then the service streams are loaded from the outgoing lower-order paths to higher-order paths (that is, the FlexE client interfaces in this application, corresponding to a client 2-1, . . . , a client 2-n shown in FIG. 20A, FIG. 20B, and FIG. 20C) and sent out from the transmitting side FlexE interface.

On the NE 2, the lower-order slot cross-connection is to process a plurality of second sub-client sub-slot payloads in a second sub-client interface based on a sub-slot cross-connection relationship between the second sub-client interface on the receiving side (for example, the sub-client 1-1 in the NE 2 device in FIG. 20A, FIG. 20B, and FIG. 20C) and a first sub-client interface on the transmitting side (for example, the sub-client 2-1 shown in FIG. 20A, FIG. 20B, and FIG. 20C), to obtain a plurality of first sub-client sub-slot payloads of the first sub-client interface, and then perform base frame encapsulation.

Sink service sending device NE 3: A receiving side is a FlexE port, and a transmitting side is an Ethernet interface. First, the streams received from the FlexE higher-order paths are demapped from the higher-order paths to lower-order path slots based on the sub-client sub-slot mapping table; and then the Ethernet packet is restored according to an Ethernet slot demapping process and sent out from the transmit-side Ethernet interface after packet layer service processing is completed.

With reference to FIG. 21A, FIG. 21B, and FIG. 21C, the following briefly describes a method for transmitting a CBR service based on a FlexE interface. As shown in FIG. 21A, FIG. 21B, and FIG. 21C, a FlexE-based communications network includes three types of devices: a source service access device NE 1, an intermediate slot cross-connect device NE 2, and a sink service sending device NE 3.

Source service access device NE 1: A receiving side is a CBR service interface such as E1/E3/T1/T3/STM-N/FC, and a transmitting side is a FlexE interface. After the receive-side port receives a CBR service bit stream, sub-client sub-slot payloads of the CBR service are obtained according to the method in any one of FIG. 13, FIG. 14 and FIG. 15; and then different CBR service streams corresponding to a plurality of obtained sub-client sub-slot payloads of the CBR service are respectively mapped to corresponding lower-order paths (that is, the sub-client interfaces in this application, corresponding to a sub-client 1-1, . . . , a sub-client 1-m shown in FIG. 21A, FIG. 21B, and FIG. 21C), then loaded to higher-order paths (that is, the FlexE client interfaces in this application, corresponding to a client 1-1, . . . , a client 1-n shown in FIG. 20A, FIG. 20B, and FIG. 20C) and sent out from the FlexE interface. Specifically, based on the method corresponding to FIG. 19 and based on a sub-client sub-slot mapping table, a sub-client sub-slot payload of each CBR service can be mapped by a TDM slot scheduler to a sub-slot corresponding to each sub-client, and then a corresponding base frame is encapsulated and sent out from a corresponding Flex-client interface. A mapping process between each Flex-client interface and a corresponding FlexE interface is an existing implementation and is not described in detail herein.

Intermediate slot cross-connect device: It is the same as the intermediate slot cross-connect device shown in FIG. 20A, FIG. 20B, and FIG. 20C. Details are not described herein.

Sink service sending device: A receiving side is a FlexE interface, and a transmitting side is a CBR service interface such as E1/E3/T1/T3/STM-N/FC. The service streams received from the FlexE higher-order paths are demapped from the higher-order paths to lower-order path slots based on the slot table, and then the CBR service bit stream is restored according to a CBR slot demapping process and sent out from the transmit-side CBR service interface.

When the FlexE interface transmits the CBR service, for a process of slicing, encapsulation, and base frame encapsulation of the CBR service, refer to the foregoing related descriptions. Details are not described herein again.

With reference to FIG. 22A, FIG. 22B, and FIG. 22C, the following briefly describes a method for transmitting an Ethernet service based on an Ethernet interface.

In FIG. 22A, FIG. 22B, and FIG. 22C, a FlexE-based communications network includes three types of devices: a source service access device NE 1, an intermediate slot cross-connect device NE 2, and a sink service sending device NE 3.

FIG. 22A, FIG. 22B, and FIG. 22C differ from FIG. 20A, FIG. 20B, and FIG. 20C mainly in that a network-side interface is a common Ethernet interface rather than a FlexE interface.

Source service access device NE 1: A receiving side is an Ethernet interface, and a transmitting side is an Ethernet interface. After the receive-side port receives an Ethernet packet, packet layer service processing (such as VLAN, IP, MPLS, and SR) is completed first, and a plurality of sub-client sub-slot payloads are obtained according to the method corresponding to FIG. 12. Then based on the method shown in FIG. 19 and based on a sub-client sub-slot mapping table, the plurality of sub-client sub-slot payloads are mapped to slots. After a base frame is encapsulated, the base frame is sent out from the corresponding Ethernet interface.

Intermediate slot cross-connect device NE 2: Both the receiving side and the transmitting side are Ethernet interfaces. First, streams from the Ethernet interface are demapped to lower-order path (that is, the sub-client interfaces in this application: a sub-client 1-1, . . . , a sub-client 1-*m* in FIG. 22A, FIG. 22B, and FIG. 22C) slots based on the sub-client sub-slot table; and then lower-order slot cross-connection is performed to cross-connect the service streams to outgoing lower-order paths (that is, the sub-client interfaces in this application: a sub-client 2-1, . . . , a sub-client 2-*m* shown in FIG. 22A, FIG. 22B, and FIG. 22C). Then based on the method shown in FIG. 19 and based on the sub-client sub-slot mapping table, the plurality of sub-client sub-slot payloads are mapped to slots. After a base frame is encapsulated, the base frame is sent out from the corresponding Ethernet interface.

On the NE 2, the lower-order slot cross-connection is to process a plurality of second sub-client sub-slot payloads in a second sub-client interface based on a sub-slot cross-connection relationship between the second sub-client interface on the receiving side (for example, the sub-client 1-1 in the NE 2 device in FIG. 22A, FIG. 22B, and FIG. 22C) and a first sub-client interface on the transmitting side (for example, the sub-client 2-1 shown in FIG. 22A, FIG. 22B, and FIG. 22C), to obtain a plurality of first sub-client sub-slot payloads of the first sub-client interface, and then perform base frame encapsulation.

Sink service sending device NE 3: A receiving side is an Ethernet interface, and a transmitting side is an Ethernet interface. First, the service streams received from the receive-side Ethernet interface are demapped to lower-order path slots based on the sub-client sub-slot mapping table; and then the Ethernet packet is restored according to an Ethernet slot demapping process and sent out from the transmit-side Ethernet interface after packet layer service processing is completed.

With reference to FIG. 23A, FIG. 23B, and FIG. 23C, the following briefly describes a method for transmitting a CBR service based on an Ethernet interface.

In FIG. 23A, FIG. 23B, and FIG. 23C, a FlexE-based communications network includes three types of devices: a source service access device NE 1, an intermediate slot cross-connect device NE 2, and a sink service sending device NE 3.

Source service access device: A receiving side is a CBR service interface such as E1/E3/T1/T3/STM-N/FC, and a transmitting side is an Ethernet interface. After the receive-side port receives a CBR service bit stream, sub-client sub-slot payloads of the CBR service are obtained according to the method in any one of FIG. 13, FIG. 14, and FIG. 15; and then different CBR service streams corresponding to a plurality of obtained sub-client sub-slot payloads of the CBR service are respectively mapped to corresponding lower-order paths (that is, the sub-client interfaces in this application: a sub-client 1-1, . . . , a sub-client 1-*m* shown in FIG. 23A, FIG. 23B, and FIG. 23C). Then based on the method shown in FIG. 19 and based on a sub-client sub-slot mapping table, the plurality of sub-client sub-slot payloads are mapped to slots. After a base frame is encapsulated, the base frame is sent out from the corresponding Ethernet interface.

Intermediate slot cross-connect device: It is the same as the intermediate slot cross-connect device shown in FIG. 22A, FIG. 22B, and FIG. 22C. Details are not described herein.

Sink service sending device: A receiving side is a flexible Ethernet interface, and a transmitting side is a CBR service interface such as 1/E3/T1/T3/STM-N/FC. First, service streams from the receive-side Ethernet interface are demapped to lower-order path slots based on the sub-client sub-slot mapping table; and then the CBR service bit stream is restored according to a CBR slot demapping process and sent out from the transmit-side CBR service interface after completion.

Figure 24:
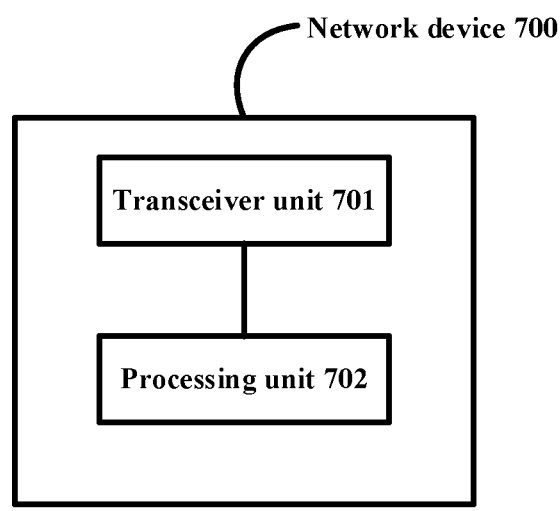
FIG. 24 is a schematic diagram of a structure of a communications apparatus according to this application.

With reference to FIG. 24, the following describes a communications apparatus 700 provided in this embodiment of this application. The communications apparatus 700 may be applied to a network architecture shown in FIG. 3. For example, the communications apparatus 700 may be, for example, the network device 1 (TX) or the network device 2 (RX) in this application, or the communications apparatus 700 may be the first communications apparatus or the second communications apparatus in this application. The first communications apparatus and the second communications apparatus in this application may be an integral network device, or may be a board in the network device 1, such as an interface board, a line card, a dummy board, or a central cross-connect board. Alternatively, the communications apparatus 800 may be the control management device in this application and performs various operations performed by the control management device. The communications apparatus 700 is configured to perform the method in the embodiment corresponding to any one of FIG. 6 to FIG. 23A, FIG. 23B, and FIG. 23C. The communications apparatus 700 includes a transceiver unit 701 and a processing unit 702. The transceiver unit 701 is configured to perform sending and receiving operations, and the processing unit is configured to perform operations other than sending and receiving. For example, when the communications apparatus 700, as the first communications apparatus, performs the method 1600 shown in FIG. 16, the processing unit 702 is configured to generate the first data stream, and the transceiver unit 701 may be configured to send the first data stream.

Figure 25:
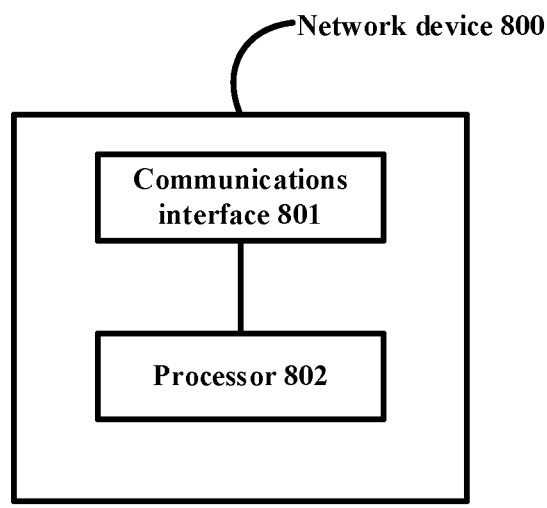
FIG. 25 is a schematic diagram of a structure of a communications apparatus according to this application.

With reference to FIG. 25, the following describes another communications apparatus 800 provided in this embodiment of this application. The communications apparatus 800 may be applied to the network architecture shown in FIG. 3. For example, the communications apparatus 800 may be, for example, the network device 1 (TX) or the network device 2 (RX) in this application, or the communications apparatus 800 may be the first communications apparatus or the second communications apparatus in this application. Alternatively, the communications apparatus 800 may be the control management device in this application and performs various operations performed by the control management device. The first communications apparatus and the second communications apparatus in this application may be an integral network device, or may be a board in the network device 1, such as an interface board, a line card, a dummy board, or a central cross-connect board. The communications apparatus 800 is configured to perform the method in the embodiment corresponding to any one of FIG. 6 to FIG. 23A, FIG. 23B, and FIG. 23C. The network apparatus 800 includes a communications interface 801 and a processor 802 connected to the communications interface. The communications interface 801 is configured to perform sending and receiving operations, and the processor 802 is configured to perform operations other than sending and receiving. For example, when the communications apparatus 800, as the first communications apparatus, performs the method 1600 shown in FIG. 16, the processor 802 is configured to generate the first data stream, and the communications interface 801 may be configured to send the first data stream.

Figure 26:
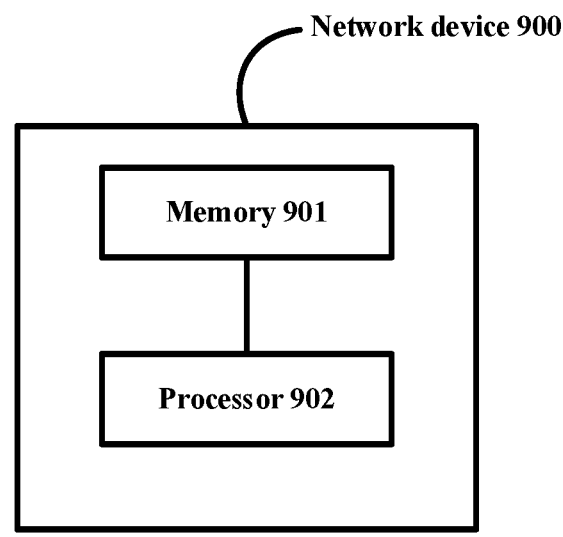
FIG. 26 is a schematic diagram of a structure of a communications apparatus according to this application.

With reference to FIG. 26, the following describes another communications apparatus 900 provided in this embodiment of this application. The communications apparatus 900 may be applied to the network architecture shown in FIG. 3. For example, the communications apparatus 900 may be, for example, the network device 1 (TX) or the network device 2 (RX) in this application, or the communications apparatus 900 may be the first communications apparatus or the second communications apparatus in this application. Alternatively, the communications apparatus 900 may be the control management device in this application and performs various operations performed by the control management device. The first communications apparatus and the second communications apparatus in this application may be an integral network device, or may be a board in the network device 1, such as an interface board, a line card, a dummy board, or a central cross-connect board. The communications apparatus 900 is configured to perform the method in the embodiment corresponding to any one of FIG. 6 to FIG. 23A, FIG. 23B, and FIG. 23C. The communications apparatus 900 includes a memory 901 and a processor 902 connected to the memory. The memory 901 stores instructions, and the processor 902 reads the instructions, so that the communications apparatus 900 performs the method in the embodiment corresponding to any one of FIG. 6 to FIG. 23A, FIG. 23B, and FIG. 23C.

Figure 27:
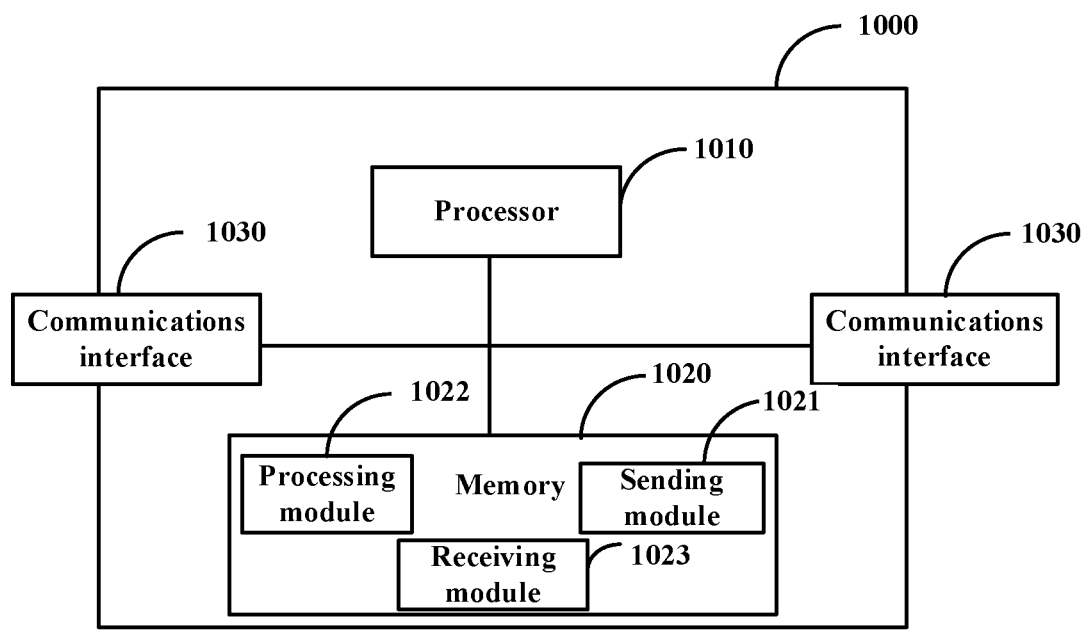
FIG. 27 is a schematic diagram of a structure of a communications apparatus according to this application.

With reference to FIG. 27, the following describes another communications apparatus 1000 provided in this embodiment of this application. The communications apparatus 800 may be applied to the network architecture shown in FIG. 3. For example, the communications apparatus 800 may be, for example, the network device 1 (TX) or the network device 2 (RX) in this application, or the communications apparatus moo may be the first communications apparatus or the second communications apparatus in this application. Alternatively, the communications apparatus woo may be the control management device in this application and performs various operations performed by the control management device. The first communications apparatus and the second communications apparatus in this application may be an integral network device, or may be a board in the network device 1, such as an interface board, a line card, a dummy board, or a central cross-connect board. The communications apparatus 800 is configured to perform the method in the embodiment corresponding to any one of FIG. 6 to FIG. 23A, FIG. 23B, and FIG. 23C. As shown in FIG. 27, the communications apparatus woo includes a processor low, a memory 1020 coupled to the processor, and a communications interface 1030. In a specific implementation, the memory 1020 stores computer-readable instructions, where the computer-readable instructions include a plurality of software modules, for example, a sending module 1021, a processing module 1022, and a receiving module 1023. After the processor 1010 executes each software module, the processor 1010 may perform a corresponding operation according to an instruction of the software module. In this embodiment, an operation performed by a software module is actually an operation performed by the processor 1010 according to an instruction of the software module. For example, when the network apparatus moo, as the first communications apparatus, performs the method shown in FIG. 16, the sending module 1021 is configured to send the first data stream, and the processing module 1022 is configured to generate the first data stream. In addition, after executing the computer-readable instructions in the memory 1020, the processor low may perform, as instructed by the computer-readable instructions, all operations that may be performed by the first communications apparatus in this application. For example, when the communications apparatus moo is used as the first communications apparatus, the communications apparatus woo may perform the method performed by the first communications apparatus in the embodiment corresponding to any one of FIG. 6 to FIG. 23A, FIG. 23B, and FIG. 23C.

The processor mentioned in this application may be a central processing unit (CPU), a network processor (NP), or a combination of a CPU and an NP. Alternatively, the processor may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The processor low may be one processor or may include a plurality of processors. The memory mentioned in this application may include a volatile memory, for example, a random access memory (RAM). Alternatively, the memory may include a non-volatile memory, for example, a read-only memory (ROM), a flash memory, a hard disk drive (HDD), or a solid-state drive (SSD). The memory may further include a combination of the foregoing types of memories. The memory may be one memory or may include a plurality of memories.

An embodiment of this application further provides a communications system including a first communications apparatus and a second communications apparatus, where the first communications apparatus or the second communications apparatus may be the communications apparatus in any one of FIG. 24 to FIG. 27, and is configured to perform the method in any one of the embodiments corresponding to FIG. 6 to FIG. 23A, FIG. 23B, and FIG. 23C. The communications system may further include the control management device in this application.

This application further provides a computer program product including a computer program. When a computer runs the computer program, the computer is enabled to perform the method performed by the first communications apparatus, the second communications apparatus, or the control management device in any one of the embodiments corresponding to FIG. 6 to FIG. 23A, FIG. 23B, and FIG. 23C.

This application provides a computer-readable medium including computer instructions. When a computer runs the computer instructions, the computer is enabled to perform the method performed by the first communications apparatus, the second communications apparatus, or the control management device in any one of the embodiments corresponding to FIG. 6 to FIG. 23A, FIG. 23B, and FIG. 23C.

A person of ordinary skill in the art may be aware that, in combination with the examples described in embodiments disclosed in this specification, modules and method operations may be implemented by electronic hardware or a combination of computer software and electronic hardware. Whether the functions are performed by hardware or software depends on particular applications and design constraint conditions of the technical solutions. A person skilled in the art may implement the described functions by using different methods for each particular application.

It may be clearly understood by a person skilled in the art that, for the purpose of convenient and brief description, for a detailed working process of the foregoing system, apparatus, and module, refer to a corresponding process in the foregoing method embodiments, and details are not described herein again.

All or some of the foregoing embodiments may be implemented by using software, hardware, firmware, or any combination thereof. When software is used in a specific implementation process, all or some of the software may be embodied in a form of a computer program product. The computer program product includes one or more computer instructions. When the computer program instructions are loaded and executed on the computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The available medium may be a magnetic medium (for example, a floppy disk, a hard disk, or a magnetic tape), an optical medium (for example, a DVD), a semiconductor medium (for example, a solid-state drive Solid-State Drive (SSD)), or the like.

Embodiments in this specification are all described in a progressive manner, for same or similar parts in embodiments, refer to these embodiments, and each embodiment focuses on a difference from other embodiments. Especially, apparatus and system embodiments are basically similar to a method embodiment, and therefore are described briefly; for related parts, refer to partial descriptions in the method embodiment.

What is claimed is:

1. A method, comprising:
generating, by a first communications apparatus, a first data stream, wherein the first data stream comprises a plurality of data code blocks,
wherein the plurality of data code blocks comprise a plurality of first base frames, each first base frame of the plurality of first base frames comprises a corresponding base frame payload, the corresponding base frame payload comprises a corresponding base frame overhead and a corresponding plurality of sub-client sub-slot payloads, the corresponding plurality of sub-client sub-slot payloads comprise a corresponding plurality of first sub-client sub-slot payloads, and the corresponding plurality of first sub-client sub-slot payloads comprise corresponding service data of a first sub-client interface, and
wherein the each first base frame further comprises a corresponding first code block and a corresponding second code block, the corresponding first code block indicates a corresponding frame header of the each first base frame, and the corresponding second code block indicates a corresponding frame trailer of the each first base frame; and
sending, by the first communications apparatus, the first data stream by using a first interface.

2. The method according to claim 1, wherein the first interface is logically divided into Z sub-client interfaces, the Z sub-client interfaces comprise the first sub-client interface, and Z is an integer greater than 1.

3. The method according to claim 1, wherein the first interface is a flexible Ethernet (FlexE) client interface.

4. The method according to claim 1, wherein the first interface is an Ethernet interface.

5. The method according to claim 1, wherein the first interface is a first FlexE client interface, the first communications apparatus further comprises a first FlexE interface on a transmitting side, and the sending the first data stream by using the first interface comprises:
sending, by the first communications apparatus, the first data stream by using the first FlexE interface based on a slot mapping relationship between the first FlexE client interface and the first FlexE interface, wherein the first FlexE interface is logically divided into a plurality of FlexE client interfaces, and the plurality of FlexE client interfaces comprise the first FlexE client interface.

6. The method according to claim 1, wherein the corresponding base frame overhead comprises one or more of:
a sequence number of the corresponding base frame,
a sub-client sub-slot mapping table,
slot adjustment request information,
slot adjustment response information,
slot effectiveness indication information,
management channel information, or
base frame overhead check information.

7. The method according to claim 1, wherein the first interface is divided into M sub-slots in time domain, a corresponding slot bandwidth of each of the M sub-slots is P, P is less than 5 gigabit/second (Gbp/s), and M is an integer greater than 1.

8. The method according to claim 7, wherein the M sub-slots are evenly distributed in X first base frames, one base frame of the X first base frames is encapsulated every time M/X sub-slots are scheduled, each base frame payload of the X first base frames comprises M/X sub-client sub-slot payloads, and X is an integer greater than 1.

9. The method according to claim 7, wherein the first interface is logically divided into Z sub-client interfaces, the Z sub-client interfaces comprise the first sub-client interface, Z is an integer greater than 1, and wherein the method further comprises:
receiving, by the first communications apparatus, a first sub-client sub-slot mapping table from a second communications apparatus, wherein the first sub-client sub-slot mapping table indicates a first mapping relationship between the M sub-slots and the Z sub-client interfaces, and each sub-client interface of the Z sub-client interfaces is mapped to at least one of the M sub-slots; and
saving, by the first communications apparatus, the first sub-client sub-slot mapping table.

10. The method according to claim 1, wherein the first data stream carries an Ethernet service or constant bit rate (CBR) service.

11. The method according to claim 1, wherein the first sub-client interface is mapped to W sub-slots of the first interface, and the generating the first data stream comprises:
respectively mapping, by the first communications apparatus, the corresponding plurality of first sub-client sub-slot payloads to the W sub-slots, wherein W is an integer greater than 1.

12. The method according to claim 1, wherein the first communications apparatus comprises a second sub-client interface on a receiving side, and the generating the first data stream comprises:
obtaining, by the first communications apparatus, a plurality of second sub-client sub-slot payloads of the second sub-client interface;
processing, by the first communications apparatus, the plurality of second sub-client sub-slot payloads based on a sub-slot cross-connection relationship between the second sub-client interface and the first sub-client interface to obtain the corresponding plurality of first sub-client sub-slot payloads; and encapsulating, by the first communications apparatus, the corresponding plurality of first sub-client sub-slot payloads into the corresponding base frame payload.

13. A first communications apparatus, comprising:
a memory storing instructions; and
at least one processor connected to the memory, wherein when the at least one processor executes the instructions, the first communications apparatus is enabled to perform operations including:
generating a first data stream,
wherein the first data stream comprises a plurality of data code blocks, wherein the plurality of data code blocks comprise a plurality of first base frames, each first base frame of the plurality of first base frames comprises a corresponding base frame payload, the corresponding base frame payload comprises a corresponding base frame overhead and a corresponding plurality of sub-client sub-slot payloads, the corresponding plurality of sub-client sub-slot payloads comprise a corresponding plurality of first sub-client sub-slot payloads, and the corresponding plurality of first sub-client sub-slot payloads comprise corresponding service data of a first sub-client interface, and
wherein the each first base frame further comprises a corresponding first code block and a corresponding second code block, the corresponding first code block indicates a corresponding frame header of the each first base frame, and the corresponding second code block indicates a corresponding frame trailer of the each first base frame; and
sending the first data stream by using a first interface.

14. The first communications apparatus according to claim 13, wherein the first interface is logically divided into Z sub-client interfaces, the Z sub-client interfaces comprise the first sub-client interface, and Z is an integer greater than 1.

15. The first communications apparatus according to claim 13, wherein the first interface is a flexible Ethernet (FlexE) client interface.

16. The first communications apparatus according to claim 13, wherein the first interface is an Ethernet interface.

17. The first communications apparatus according to claim 13, wherein the first interface is a first FlexE client interface, the first communications apparatus further comprises a first FlexE interface on a transmitting side, and the sending the first data stream by using the first interface comprises:
sending the first data stream by using the first FlexE interface based on a slot mapping relationship between the first FlexE client interface and the first FlexE interface, wherein the first FlexE interface is logically divided into a plurality of FlexE client interfaces, and the plurality of FlexE client interfaces comprise the first FlexE client interface.

18. The first communications apparatus according to claim 13, wherein the corresponding base frame overhead comprises one or more of:
a sequence number of the corresponding base frame,
a sub-client sub-slot mapping table,
slot adjustment request information,
slot adjustment response information,
slot effectiveness indication information,
management channel information, or
base frame overhead check information.

19. The first communications apparatus according to claim 13, wherein the first interface is divided into M sub-slots in time domain, a corresponding slot bandwidth of each of the M sub-slots is P, P is less than 5 gigabit/second (Gbp/s), and M is an integer greater than 1.

20. The first communications apparatus according to claim 19, wherein the M sub-slots are evenly distributed in X first base frames, one base frame of the X first base frames is encapsulated every time M/X sub-slots are scheduled, each base frame payload of the X first base frames comprises M/X sub-client sub-slot payloads, and X is an integer greater than 1.

21. The first communications apparatus according to claim 19, wherein the first interface is logically divided into Z sub-client interfaces, the Z sub-client interfaces comprise the first sub-client interface, Z is an integer greater than 1, and wherein the operations further comprise:
receiving a first sub-client sub-slot mapping table from a second communications apparatus, wherein the first sub-client sub-slot mapping table indicates a first mapping relationship between the M sub-slots and the Z sub-client interfaces, and each sub-client interface of the Z sub-client interfaces is mapped to at least one of the M sub-slots; and
saving the first sub-client sub-slot mapping table.

22. The first communications apparatus according to claim 13, wherein the first data stream carries an Ethernet service or constant bit rate (CBR) service.

23. The first communications apparatus according to claim 13, wherein the first data stream comprises a plurality of 64B/66B code blocks, a plurality of 64B/65B code blocks, or a plurality of 256B/257B code blocks.

24. The first communications apparatus according to claim 13, wherein the first sub-client interface is mapped to W sub-slots of the first interface, and the generating the first data stream comprises:
respectively mapping the corresponding plurality of first sub-client sub-slot payloads to the W sub-slots, wherein W is an integer greater than 1.

25. The first communications apparatus according to claim 13, wherein the first communications apparatus comprises a second sub-client interface on a receiving side, and the generating the first data stream comprises:
obtaining a plurality of second sub-client sub-slot payloads of the second sub-client interface;
processing the plurality of second sub-client sub-slot payloads based on a sub-slot cross-connection relationship between the second sub-client interface and the first sub-client interface to obtain the corresponding plurality of first sub-client sub-slot payloads; and
encapsulating the corresponding plurality of first sub-client sub-slot payloads into the corresponding base frame payload.

* * * * *